(12) United States Patent
Liu et al.

(10) Patent No.: US 11,171,737 B2
(45) Date of Patent: Nov. 9, 2021

(54) FLEXIBLE RESOURCE MAPPING AND MCS DETERMINATION

(71) Applicant: QUALCOMM Incorporated, San Diego, CA (US)

(72) Inventors: Xiaohui Liu, Beijing (CN); Neng Wang, Beijing (CN); Yu Zhang, Beijing (CN); Jilei Hou, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 197 days.

(21) Appl. No.: 15/781,671

(22) PCT Filed: Dec. 9, 2015

(86) PCT No.: PCT/CN2015/096812
§ 371 (c)(1),
(2) Date: Jun. 5, 2018

(87) PCT Pub. No.: WO2017/096558
PCT Pub. Date: Jun. 15, 2017

(65) Prior Publication Data
US 2018/0278365 A1 Sep. 27, 2018

(51) Int. Cl.
*H04L 27/00* (2006.01)
*H04L 1/00* (2006.01)
*H04L 1/18* (2006.01)

(52) U.S. Cl.
CPC .......... *H04L 1/0003* (2013.01); *H04L 1/0009* (2013.01); *H04L 1/0015* (2013.01);
(Continued)

(58) Field of Classification Search
CPC . H04L 1/0003; H04L 1/0009; H04L 27/0012; H04L 1/1893; H04L 1/1841; H04L 1/0015; H04L 1/0026; H04L 1/18
See application file for complete search history.

(56) References Cited

U.S. PATENT DOCUMENTS 8,862,143 B2 * 10/2014 Damnjanovic ........ H04B 7/022
455/450
9,036,515 B2 * 5/2015 Novak ...................... H04L 1/14
370/300
(Continued)

FOREIGN PATENT DOCUMENTS

CN 104753631 A 7/2015
EP 2426843 A1 * 3/2012 ......... H04B 7/15542
(Continued)

OTHER PUBLICATIONS

International Search Report and Written Opinion—PCT/CN2015/096812—ISA/EPO—dated Sep. 20, 2016.

*Primary Examiner* — Jay P Patel
(74) *Attorney, Agent, or Firm* — Patterson & Sheridan, LLP

(57) ABSTRACT

Certain aspects of the present disclosure relate to methods and apparatus for flexible resource mapping and modulation and coding scheme (MCS) determination in wireless communication systems. According to certain aspects, a method for wireless communications that may be performed by a transmitter is provided. The method generally includes determining MCSs to use for each of multiple portions of a transport block and transmitting the portions of the transport block according to the determined MCSs to a wireless node. Flexible MCS and resource mapping determination may improve demodulation performance for code blocks that are far from pilots.

28 Claims, 26 Drawing Sheets

(52) U.S. Cl.
CPC .............. *H04L 1/0026* (2013.01); *H04L 1/18* (2013.01); *H04L 1/1893* (2013.01); *H04L 27/0012* (2013.01); *H04L 1/1841* (2013.01)

(56) References Cited

U.S. PATENT DOCUMENTS

| | | | | |
|---|---|---|---|---|
| 9,112,552 B2* | 8/2015 | Ko | ................ | H04B 7/0413 |
| 9,374,191 B2* | 6/2016 | Tabet | ................ | H04L 1/0003 |
| 9,602,235 B2* | 3/2017 | Roh | ................ | H03M 13/2906 |
| 9,712,306 B2* | 7/2017 | Ji | ................ | H04L 1/0003 |
| 9,854,583 B2* | 12/2017 | Ko | ................ | H04B 1/707 |
| 10,230,493 B2* | 3/2019 | Roh | ................ | H04L 1/0061 |
| 10,231,254 B2* | 3/2019 | Chen | ................ | H04W 72/1273 |
| 10,349,419 B2* | 7/2019 | Ko | ................ | H04B 1/707 |
| 2006/0023624 A1* | 2/2006 | Han | ................ | H04L 1/0003 370/204 |
| 2007/0025357 A1* | 2/2007 | Zhang | ................ | H04L 1/0018 370/395.4 |
| 2007/0153672 A1 | 7/2007 | Terry et al. | | |
| 2009/0100300 A1* | 4/2009 | Kim | ................ | H04L 1/0042 714/702 |
| 2010/0061400 A1* | 3/2010 | Hong | ................ | H04L 1/0057 370/466 |
| 2010/0103920 A1 | 4/2010 | Damnjanovic et al. | | |
| 2010/0246604 A1* | 9/2010 | Kim | ................ | H04L 5/0053 370/474 |
| 2011/0064159 A1* | 3/2011 | Ko | ................ | H04B 7/04 375/267 |
| 2012/0099509 A1* | 4/2012 | Ai | ................ | H04L 1/007 370/312 |
| 2012/0106450 A1* | 5/2012 | Golitschek Edler Von Elbwart | ................ | H04L 1/003 370/328 |
| 2012/0176957 A1* | 7/2012 | Chen | ................ | H04B 7/155 370/315 |
| 2012/0243511 A1* | 9/2012 | Lv | ................ | H04L 1/0031 370/335 |
| 2012/0327884 A1* | 12/2012 | Seo | ................ | H04W 52/244 370/329 |
| 2013/0021991 A1* | 1/2013 | Ko | ................ | H04W 72/048 370/329 |
| 2013/0036338 A1* | 2/2013 | Kotecha | ................ | H04L 1/1812 714/748 |
| 2013/0051354 A1* | 2/2013 | Ling | ................ | H04L 1/005 370/329 |
| 2013/0170469 A1* | 7/2013 | Yu | ................ | H04L 1/0003 370/330 |
| 2013/0184023 A1* | 7/2013 | Asokan | ................ | H04W 24/08 455/509 |
| 2013/0195122 A1* | 8/2013 | Li | ................ | H04L 1/0026 370/479 |
| 2013/0258968 A1* | 10/2013 | Hong | ................ | H04W 72/085 370/329 |
| 2013/0324182 A1* | 12/2013 | Deng | ................ | H04W 92/18 455/522 |
| 2014/0086351 A1* | 3/2014 | Nammi | ................ | H04B 7/0456 375/267 |
| 2014/0136922 A1* | 5/2014 | Oketani | ................ | H03M 13/6525 714/762 |
| 2014/0313985 A1* | 10/2014 | Nimbalker | ................ | H04L 1/0061 370/329 |
| 2014/0341320 A1* | 11/2014 | Hua | ................ | H04B 7/0417 375/299 |
| 2014/0348120 A1* | 11/2014 | Kant | ................ | H04L 25/03898 370/329 |
| 2014/0362832 A1* | 12/2014 | Rudolf | ................ | H04L 1/1887 370/336 |
| 2015/0155976 A1* | 6/2015 | Fan | ................ | H04L 1/1861 714/749 |
| 2015/0172007 A1* | 6/2015 | Oketani | ................ | H04L 1/1893 370/329 |
| 2015/0195069 A1* | 7/2015 | Yi | ................ | H04W 4/70 370/329 |
| 2015/0263825 A1* | 9/2015 | Kim | ................ | H04L 1/0013 375/260 |
| 2015/0289237 A1* | 10/2015 | Kim | ................ | H04L 27/26 370/329 |
| 2015/0296518 A1* | 10/2015 | Yi | ................ | H04L 1/08 370/336 |
| 2015/0304080 A1* | 10/2015 | Yi | ................ | H04W 72/044 370/329 |
| 2015/0319750 A1* | 11/2015 | Ko | ................ | H04L 5/0007 370/335 |
| 2015/0326369 A1* | 11/2015 | Kim | ................ | H04L 5/005 370/252 |
| 2015/0358060 A1* | 12/2015 | Park | ................ | H04L 1/06 370/329 |
| 2015/0381209 A1* | 12/2015 | Roh | ................ | H03M 13/618 714/755 |
| 2016/0037524 A1* | 2/2016 | Krzymien | ................ | H04L 1/1896 370/329 |
| 2016/0212749 A1* | 7/2016 | Abraham | ................ | H04W 52/262 |
| 2016/0219600 A1* | 7/2016 | Li | ................ | H04L 5/0057 |
| 2016/0294593 A1* | 10/2016 | Yi | ................ | H04W 72/042 |
| 2017/0126379 A1* | 5/2017 | Choi | ................ | H04L 1/00 |
| 2017/0135084 A1* | 5/2017 | Kuchibhotla | ................ | H04L 5/0053 |
| 2017/0135116 A1* | 5/2017 | Kuchibhotla | ................ | H04W 72/0406 |
| 2017/0163396 A1* | 6/2017 | Blankenship | ................ | H04L 1/0031 |
| 2017/0195082 A1* | 7/2017 | Roh | ................ | H03M 13/2792 |
| 2017/0295580 A1* | 10/2017 | Ji | ................ | H04L 1/0003 |
| 2018/0042040 A1* | 2/2018 | Chen | ................ | H04W 72/1263 |
| 2018/0070351 A1* | 3/2018 | Ko | ................ | H04B 1/707 |
| 2019/0036829 A1* | 1/2019 | Ji | ................ | H04L 47/2483 |
| 2019/0207703 A1* | 7/2019 | Roh | ................ | H04L 1/0041 |

FOREIGN PATENT DOCUMENTS

| | | | |
|---|---|---|---|
| WO | WO-2010050688 A2 | 5/2010 | |
| WO | WO-2018127093 A1 * | 7/2018 | ............ H04W 72/04 |

* cited by examiner

FLEXIBLE RESOURCE MAPPING AND MCS DETERMINATION

BACKGROUND

Field of the Disclosure

The present disclosure relates generally to wireless communication, and more particularly, to methods and apparatus for flexible resource mapping and modulation and coding scheme (MCS) determination in wireless communication systems.

Description of Related Art

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE/LTE-Advanced is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure provide a method for wireless communications that can be performed by a transmitter. The method generally includes determining modulation and coding schemes (MCSs) to use for each of multiple portions of a transport block and transmitting the portions of the transport block according to the determined MCSs to a wireless node.

Certain aspects of the present disclosure provide a method for wireless communications that can be performed by a transmitter. The method generally includes determining a mapping of portions of a transport block to transmission resources, transmitting the transport block according to the first mapping, determining one or more other mappings of portions of the transport block to transmission resources, and re-transmitting the transport block, at least once, according to one of the other mappings.

Certain aspects of the present disclosure provide an apparatus for wireless communications. The apparatus generally includes means for determining modulation and coding schemes (MCSs) to use for each of multiple portions of a transport block and means for transmitting the portions of the transport block according to the determined MCSs to a wireless node.

Certain aspects of the present disclosure provide an apparatus for wireless communications. The apparatus generally includes means for determining a mapping of portions of a transport block to transmission resources, means for transmitting the transport block according to the first mapping, means for determining one or more other mappings of portions of the transport block to transmission resources, and means for re-transmitting the transport block, at least once, according to one of the other mappings.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. The appended drawings illustrate only certain typical aspects of this disclosure, however, and are therefore not to be considered limiting of its scope, for the description may admit to other equally effective aspects.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
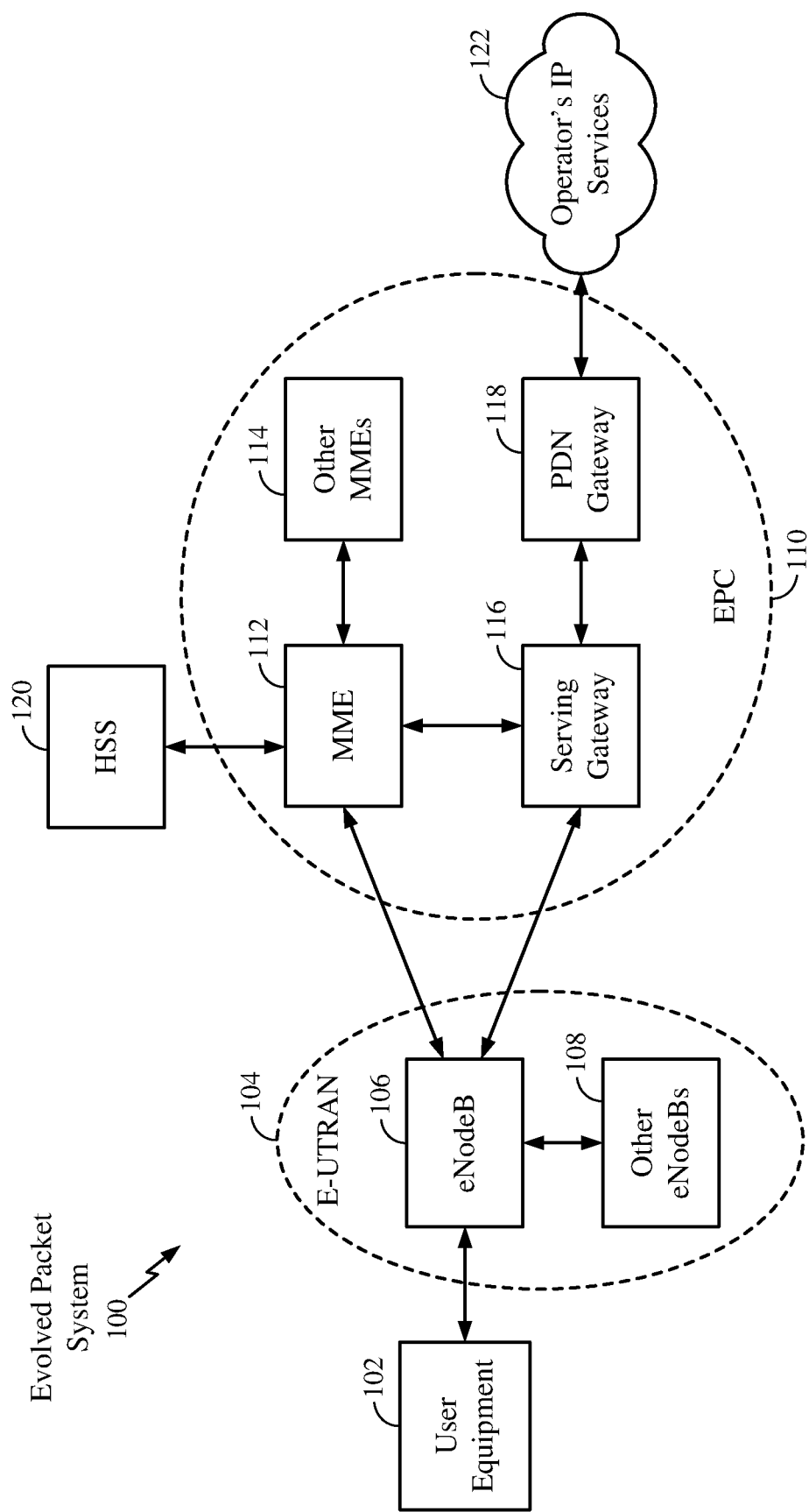
FIG. 1 is a diagram illustrating an example of a network architecture.

Demodulation signal-to-noise ratio (SNR) can be varied across space, time, and frequency due to the variation of channel estimation. For example, demodulation of code blocks within a transport block can due to poor channel estimation of earlier symbols. Thus, certain aspects of the present disclosure discuss techniques for flexible resource mapping and modulation and coding scheme (MCS) determination in wireless communication systems. For example, these techniques include determining a MCS on a per-symbol or per-code block basis—rather than using a same MCS for all of the code blocks within a transport block. As another example, these techniques can include using different resource mappings for the code blocks for hybrid automatic repeat request (HARM) retransmissions of the transport block.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA2000, etc. UTRA includes Wideband-CDMA (W-CDMA) and Low Chip Rate (LCR). CDMA2000 covers IS-2000, IS-95, and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is a release of UMTS that uses E-UTRA. UTRA, E-UTRA, GSM, UMTS, and LTE are described in documents from an organization named "3rd Generation Partnership Project" (3GPP). CDMA2000 is described in documents from an organization named "3rd Generation Partnership Project 2" (3GPP2). These communications networks are merely listed as examples of networks in which the techniques described in this disclosure may be applied; however, this disclosure is not limited to the above-described communications network.

Single carrier frequency division multiple access (SC-FDMA) is a transmission technique that utilizes single carrier modulation at a transmitter side and frequency domain equalization at a receiver side. The SC-FDMA has similar performance and essentially the same overall complexity as those of OFDMA system. However, SC-FDMA signal has lower peak-to-average power ratio (PAPR) because of its inherent single carrier structure. The SC-FDMA has drawn great attention, especially in the uplink (UL) communications where lower PAPR greatly benefits the wireless node in terms of transmit power efficiency.

An access point ("AP") may comprise, be implemented as, or known as NodeB, Radio Network Controller ("RNC"), eNodeB (eNB), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or be known as an access terminal, a subscriber station, a subscriber unit, a mobile station, a remote station, a remote terminal, a user terminal, a user agent, a user device, user equipment (UE), a user station, a wireless node, or some other terminology. In some implementations, an access terminal may comprise a cellular telephone, a smart phone, a cordless telephone, a Session Initiation Protocol ("SIP") phone, a wireless local loop ("WLL") station, a personal digital assistant ("PDA"), a tablet, a netbook, a smartbook, an ultrabook, a handheld device having wireless connection capability, a Station ("STA"), or some other suitable processing device connected to a wireless modem. Accordingly, one or more aspects taught herein may be incorporated into a phone (e.g., a cellular phone, a smart phone), a computer (e.g., a desktop), a portable communication device, a portable computing device (e.g., a laptop, a personal data assistant, a tablet, a netbook, a smartbook, an ultrabook), medical devices or equipment, biometric sensors/devices, an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium. In some aspects, the node is a wireless node. A wireless node may provide, for example, connectivity for or to a network (e.g., a wide area network such as the Internet or a cellular network) via a wired or wireless communication link.

It is noted that while aspects may be described herein using terminology commonly associated with 3G and/or 4G wireless technologies, aspects of the present disclosure can be applied in other generation-based communication systems, such as 5G and later.

An Example Wireless Communications Systems

FIG. 1 is a diagram illustrating an LTE network architecture 100 in which aspects of the present disclosure may be practiced.

For example, a wireless node (e.g., a base station 106, 108, etc. or a UE 102) may determine a modulation and coding schemes (MCSs) to use for each of multiple portions of a transport block. The transmitter may then transmit the portions of the transport block according to the determined MCSs to a wireless node (e.g., a base station 106, 108, etc. or a UE 102).

The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. Exemplary other access networks may include an IP Multimedia Subsystem (IMS) PDN, Internet PDN, Administrative PDN (e.g., Provisioning PDN), carrier-specific PDN, operator-specific PDN, and/or GPS PDN. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control plane protocol terminations toward the UE 102. The eNB 106 may be connected to the other eNBs 108 via an X2 interface (e.g., backhaul). The eNB 106 may also be referred to as a base station, a base transceiver station, a radio base station, a radio transceiver, a transceiver function, a basic service set (BSS), an extended service set (ESS), an access point, or some other suitable terminology. The eNB 106 may provide an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a netbook, a smart book, an ultrabook, a drone, a robot, a sensor, a monitor, a meter, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include, for example, the Internet, the Intranet, an IP Multimedia Subsystem (IMS), and a PS (packet-switched) Streaming Service (PSS). In this manner, the UE 102 may be coupled to the PDN through the LTE network.

Figure 2:
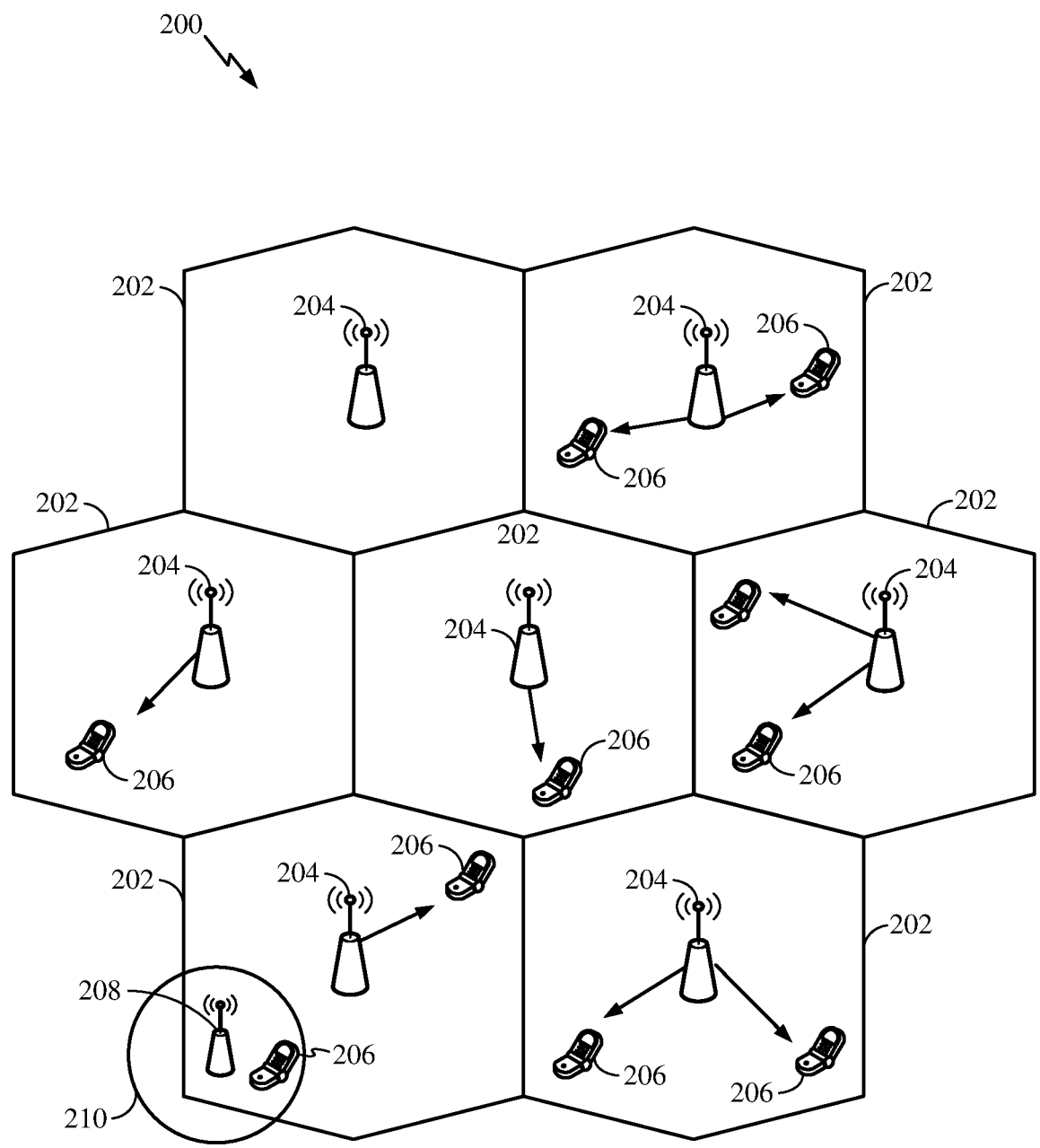
FIG. 2 is a diagram illustrating an example of an access network.

FIG. 2 is a diagram illustrating an example of an access network 200 in an LTE network architecture in which aspects of the present disclosure may be practiced. For example, eNBs 204 and UEs 206 may be configured to implement techniques for flexible MCS determination and resource mapping, in accordance with certain aspects of the present disclosure.

In this example, the access network 200 is divided into a number of cellular regions (cells) 202. One or more lower power class eNBs 208 may have cellular regions 210 that overlap with one or more of the cells 202. A lower power class eNB 208 may be referred to as a remote radio head (RRH). The lower power class eNB 208 may be a femto cell (e.g., home eNB (HeNB)), pico cell, or micro cell. The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. The network 200 may also include one or more relays (not shown). According to one application, a UE may serve as a relay.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (e.g., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
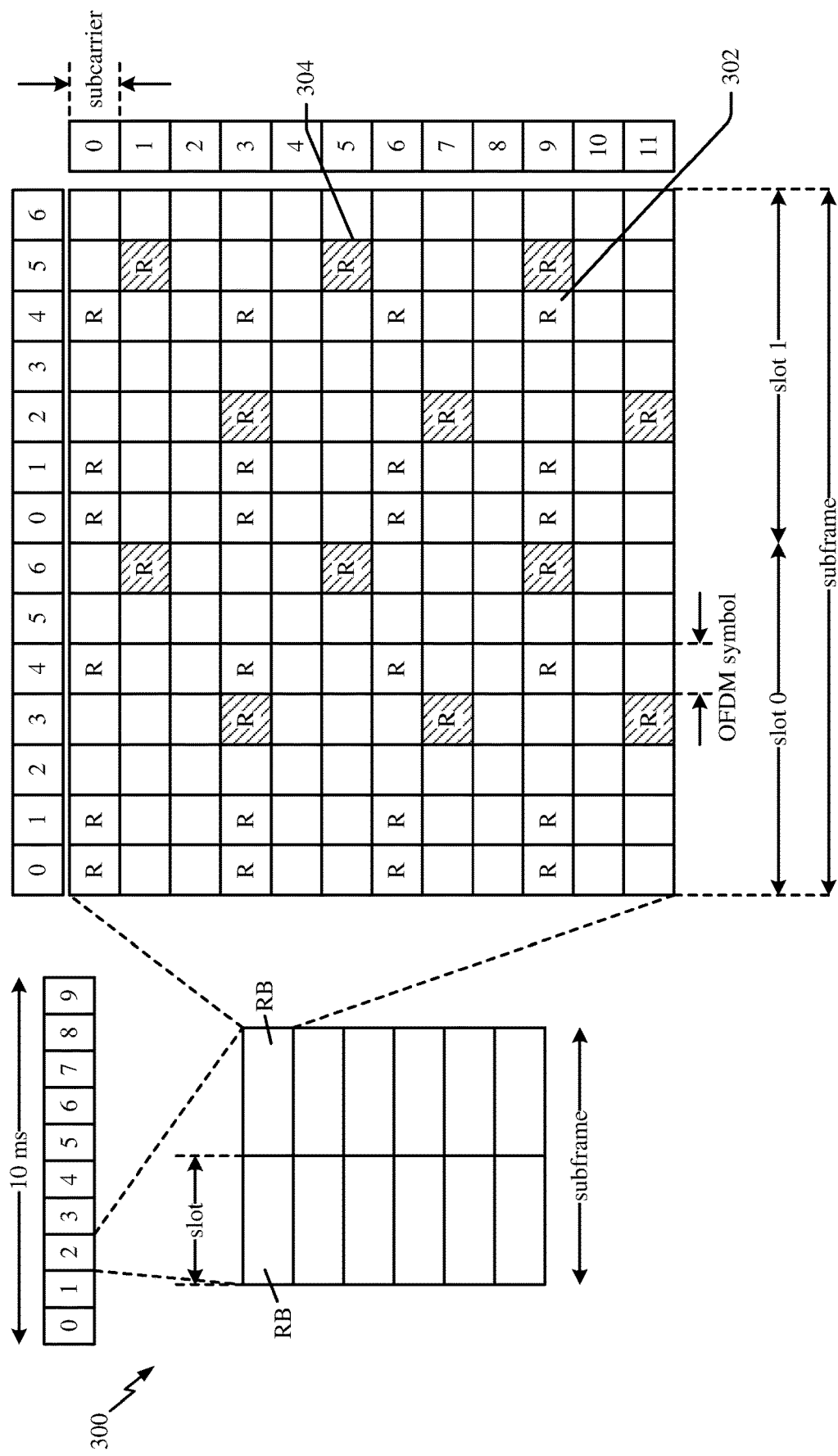
FIG. 3 is a diagram illustrating an example of a DL frame structure in LTE.

FIG. 3 is a diagram 300 illustrating an example of a DL frame structure in LTE. A frame (10 ms) may be divided into 10 equally sized sub-frames with indices of 0 through 9. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, R 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix (CP). The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. The eNB may send a Physical HARQ Indicator Channel (PHICH) and a Physical Downlink Control Channel (PDCCH) in the first M symbol periods of each subframe. The PHICH may carry information to support hybrid automatic repeat request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink.

The eNB may send the PSS, SSS, and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH, and PHICH in a broadcast manner to all UEs, may send the PDCCH in a unicast manner to specific UEs, and may also send the PDSCH in a unicast manner to specific UEs.

A number of resource elements may be available in each symbol period. Each resource element (RE) may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1, and 2. The PDCCH may occupy 9, 18, 36, or 72 REGs, which may be selected from the available REGs, in the first M symbol periods, for example. Only certain combinations of REGs may be allowed for the PDCCH. In aspects of the present methods and apparatus, a subframe may include more than one PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

Figure 4:
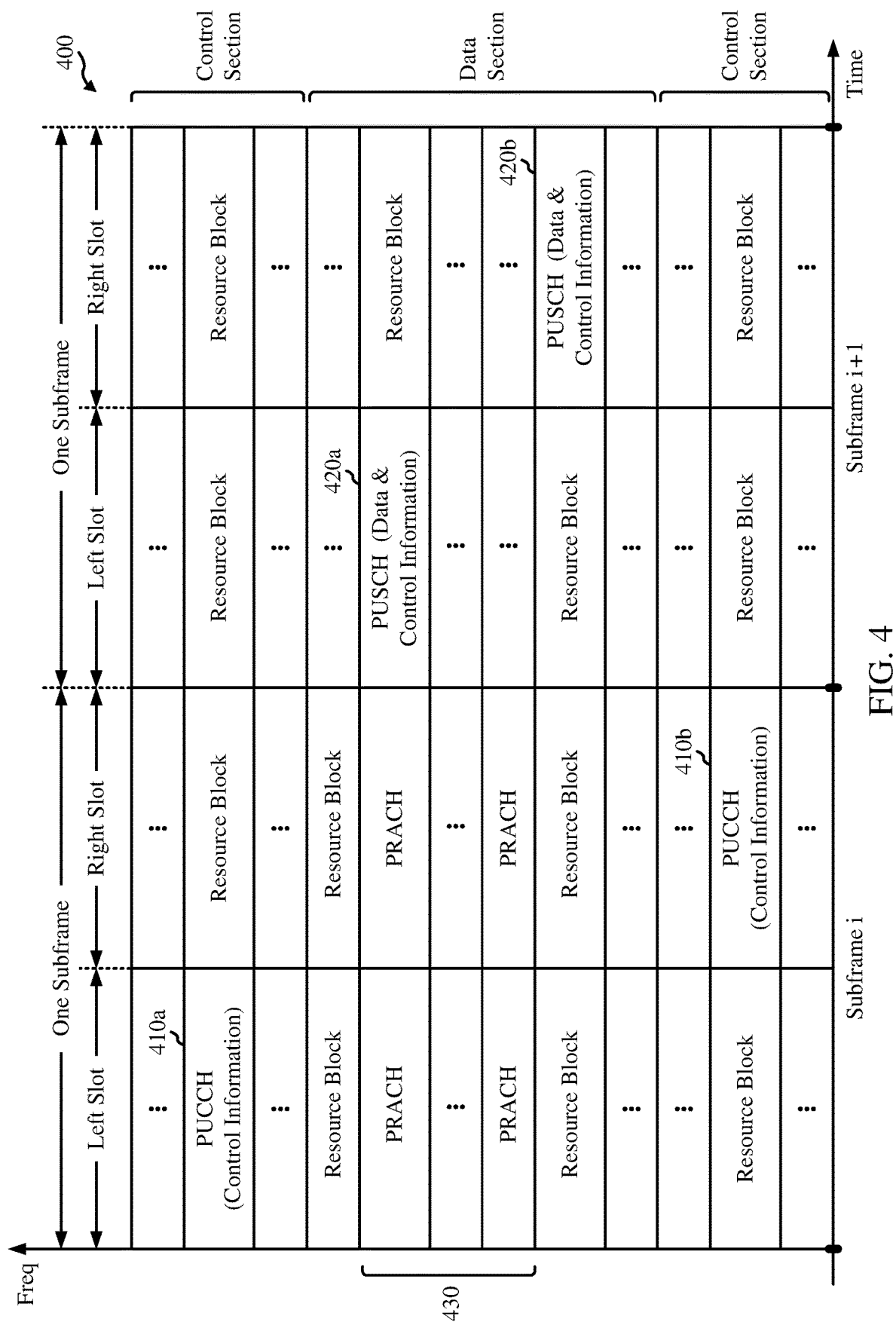
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
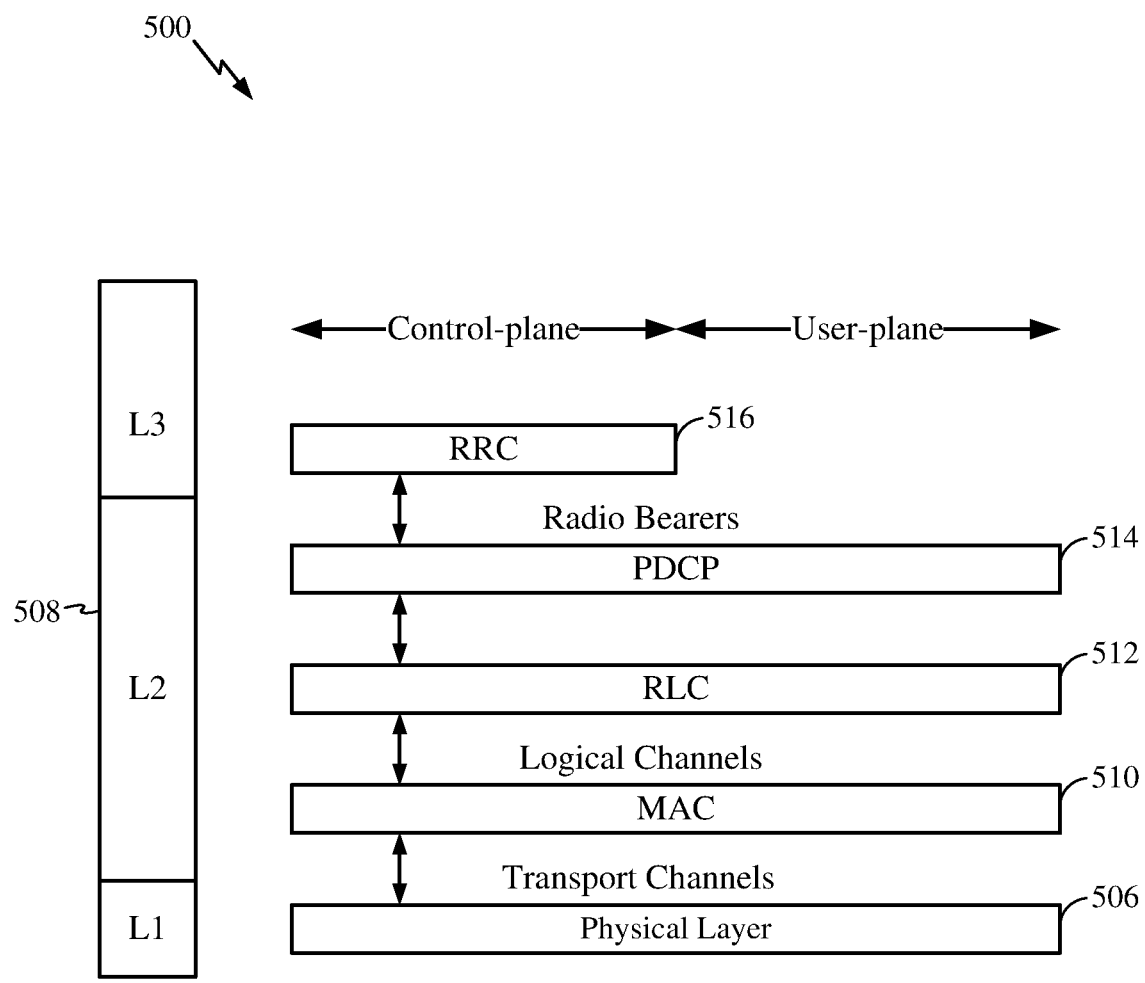
FIG. 5 is a diagram illustrating an example of a radio protocol architecture for the user and control plane.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNB s. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
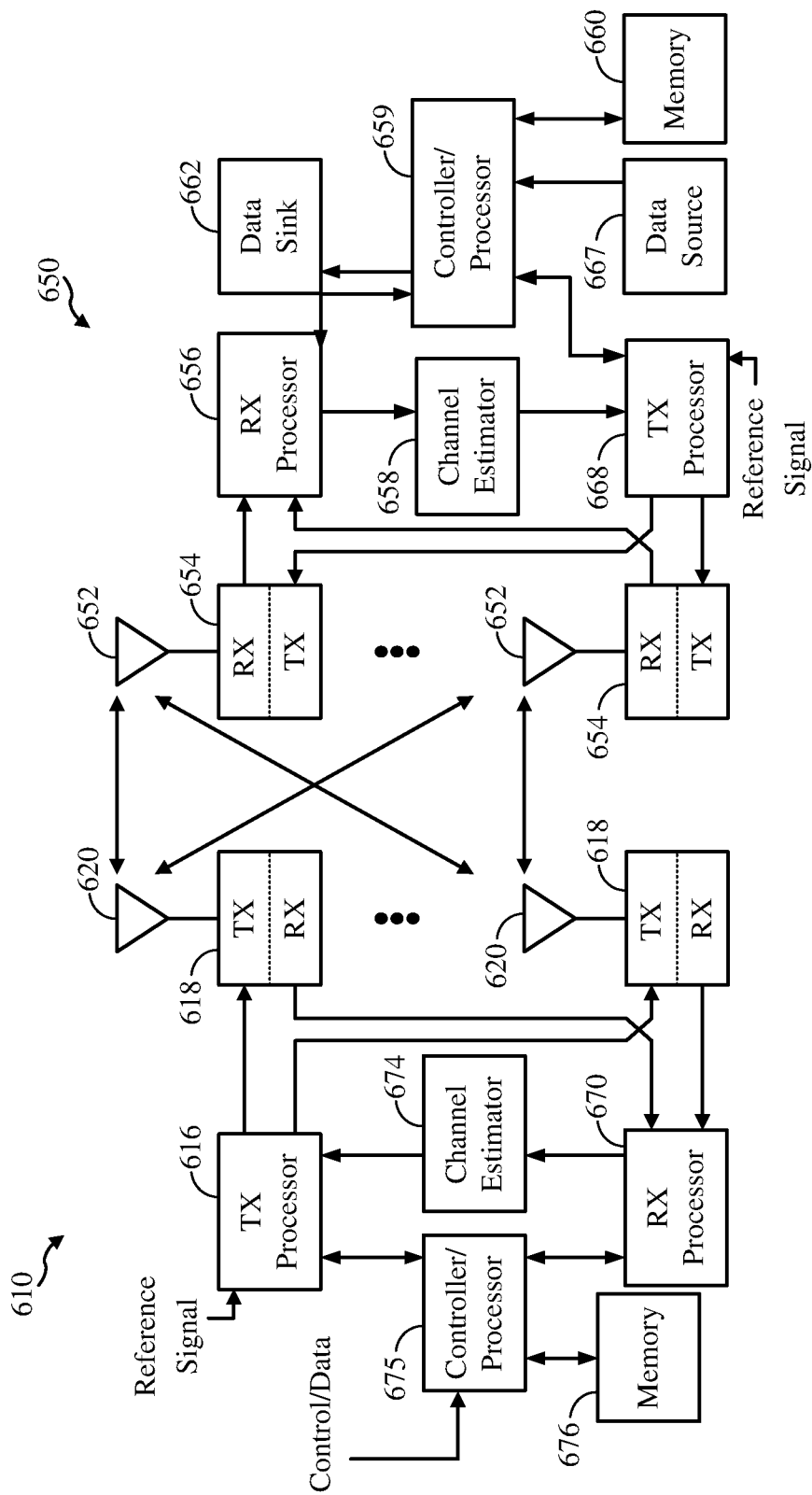
FIG. 6 is a diagram illustrating an example of an evolved Node B and user equipment in an access network, in accordance with certain aspects of the disclosure.

FIG. 6 is a block diagram of an eNB 610 in communication with a UE 650 in an access network, in which aspects of the present disclosure may be practiced.

In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The TX processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receiver (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the control/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations. The controllers/processors 675, 659 may direct the operations at the eNB 610 and the UE 650, respectively.

Figure 12:
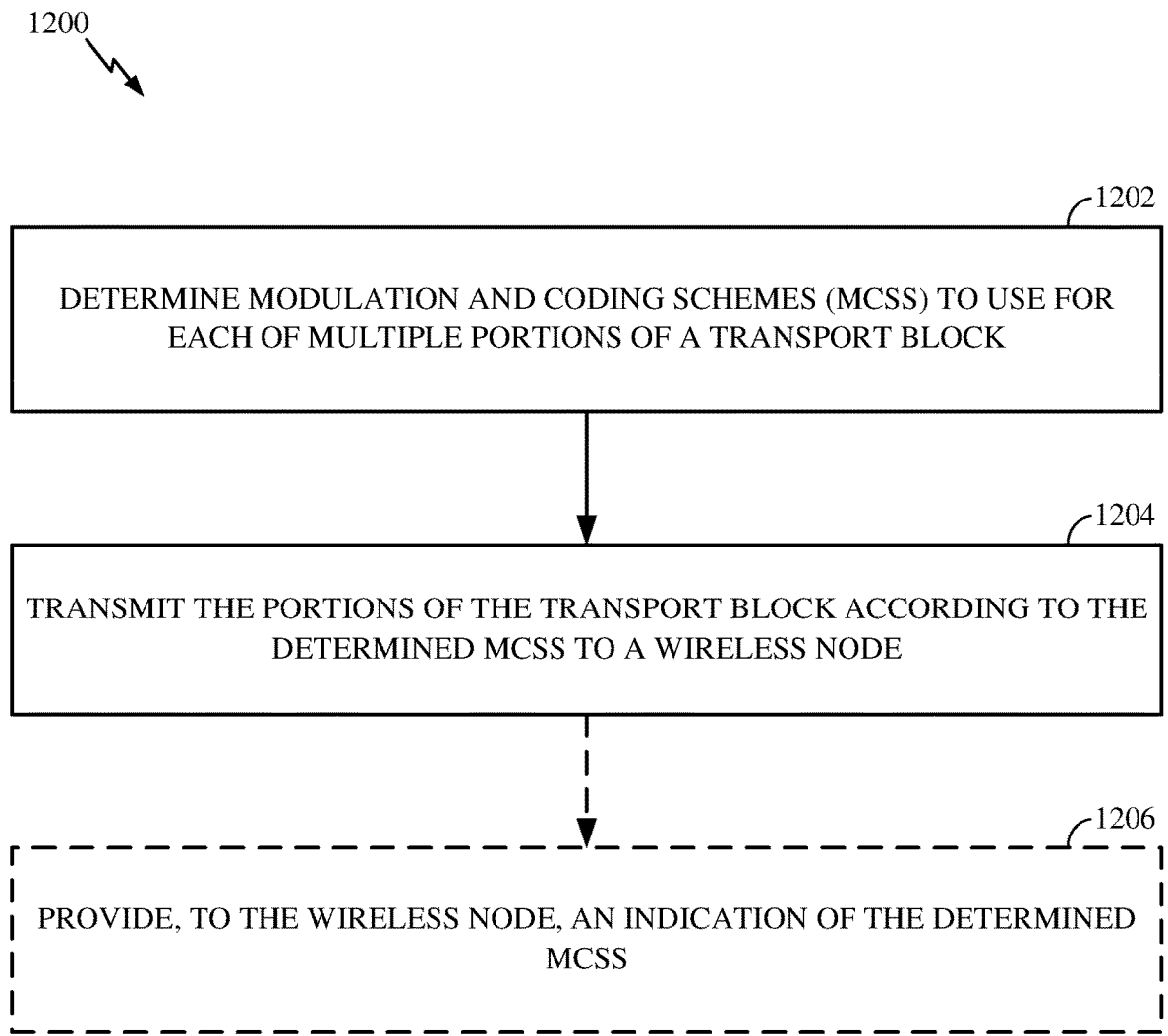
FIG. 12 illustrates example operations that may be performed by a transmitter for flexible resource mapping and modulation and coding scheme (MCS) determination at the transmitter, in accordance with certain aspects of the present disclosure.
Figure 20:
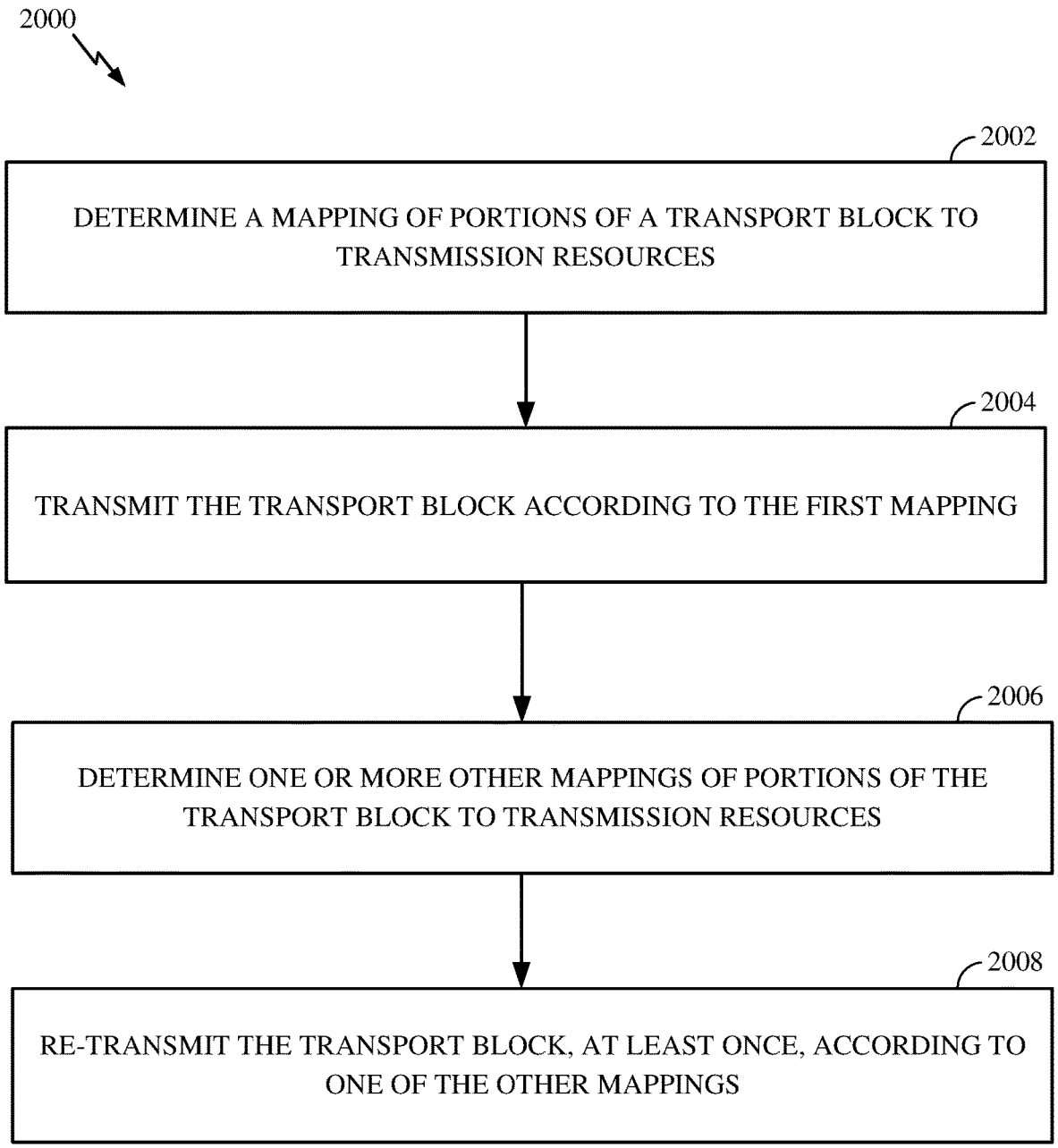
FIG. 20 illustrates example operations that may be performed by a transmitter for resource remapping for retransmissions, in accordance with certain aspects of the present disclosure.

The controller/processor 675 and/or other processors and modules at the eNB 610 and the controller/processor 659 and/or other processors and modules at the UE 650 may perform or direct operations, for example, operations 1200 in FIG. 12, operations 2000 in FIG. 20, and/or other processes for the techniques described herein for interleaving at a transmitter and de-interleaving at a receiver. In certain aspects, one or more of any of the components shown in FIG. 6 may be employed to perform example operations 1200 and 2000 and/or other processes for the techniques described herein. The memories 660 and 676 may store data and program codes for the UE 650 and eNB 610 respectively, accessible and executable by one or more other components of the UE 650 and the eNB 610.

Example Techniques for Flexible Resource Mapping and MCS Determination

In certain systems (e.g., long term evolution (LTE) systems), processing of data for transmission on the downlink (e.g., on physical downlink shared channel (PDSCH)) and the uplink (e.g., on physical uplink shared channel (PUSCH)) generally includes generation of one or more transport blocks (TB). A transport block is a medium access control (MAC) protocol data unit (MPDU) that is delivered to the physical layer. At a transmitter, data to be transmitted is first received by a packet data compression protocol (PDCP) layer. The PDCP layer performs compression and ciphering/integrity if applicable. The PDCP layer passes on the data to the radio link control (RLC) layer which concatenates it to RLC PDU. The RLC layer concatenates or segments the data coming from the PDCP layer into correct block size and forwards it to the MAC layer with its own header. The MAC layer selects the modulation and coding scheme (MCS) and configures the physical layer. At this stage, the data is in the shape of a transport block (TB). Generally, the number of bits contained in a transport block depends on the MCS and the number of resource blocks assigned, for example, to a UE for downlink transmission.

Figure 7:
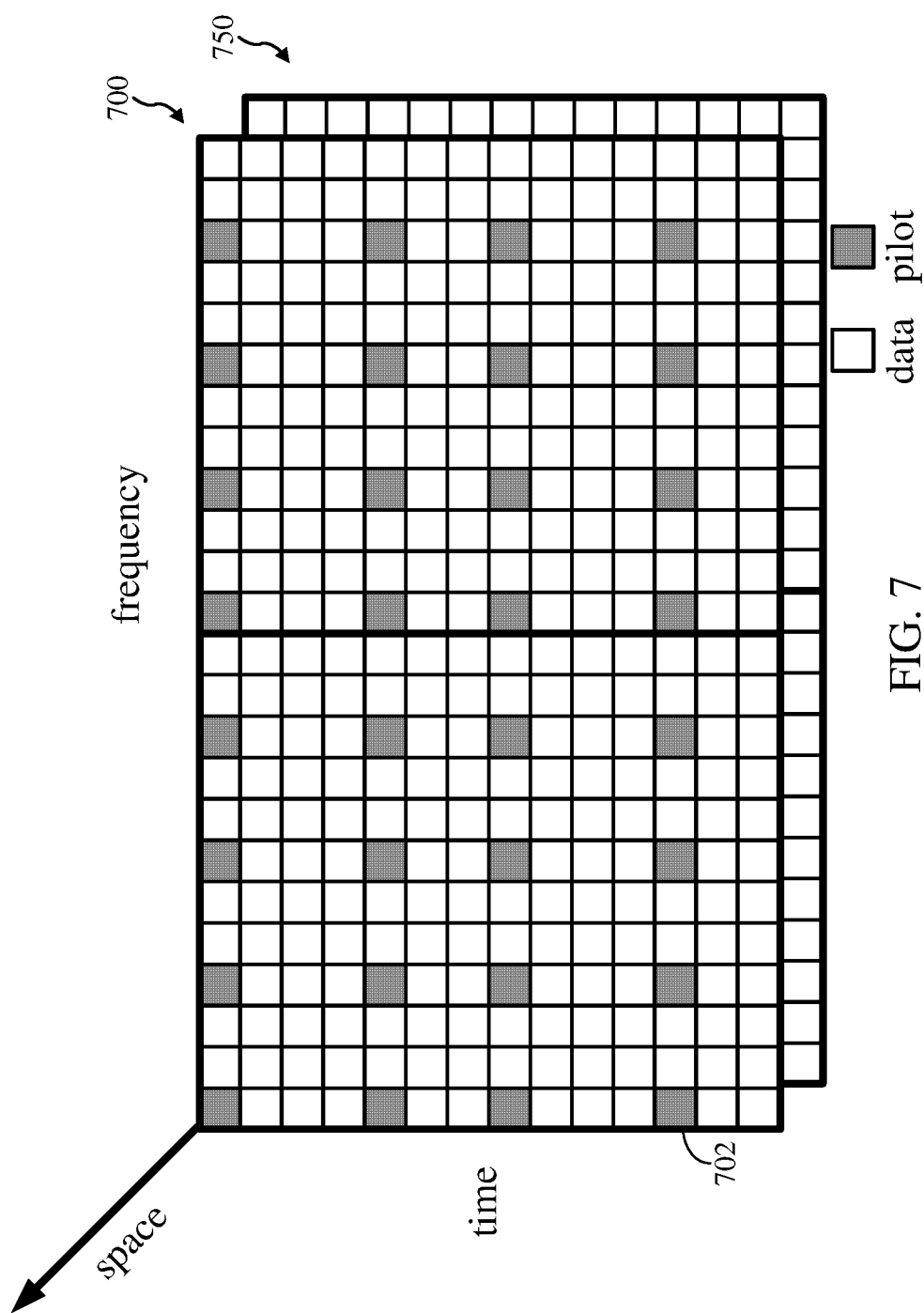
FIG. 7 is a grid illustrating an example mapping of data and pilot to time, frequency, and spatial resources, in accordance with certain aspects of the present disclosure.

FIG. 7 is a grid illustrating an example resource mapping 700 that could be used for transport transmission. As shown in FIG. 7, data and pilot can be mapped to time resources (symbols), frequency resources (subcarriers), and spatial resources (layers) in a wideband system. A resource element (RE) corresponds to a subcarrier, symbol, layer location in the grid. As shown in FIG. 7, pilots are inserted in the resource grid for channel estimation at the receiver side. RE 702 is one example of an RE carrying a pilot.

At the receiver side, it may be beneficial for the receiver to know the channel response, in order to decode the data transmitted from the transmission side. Channel response at a data location can be interpolated/extrapolated based on observations on pilot location. Given a pilot structure, channel estimation may be less accurate at lower correlation. In other words, the further a symbol is from the last pilot location, the less accurate the channel estimation may be for that symbol. Therefore, demodulation signal-to-noise ratio (SNR) may be varied across space/time/frequency due to the variation of channel estimation accuracy.

Figure 8:
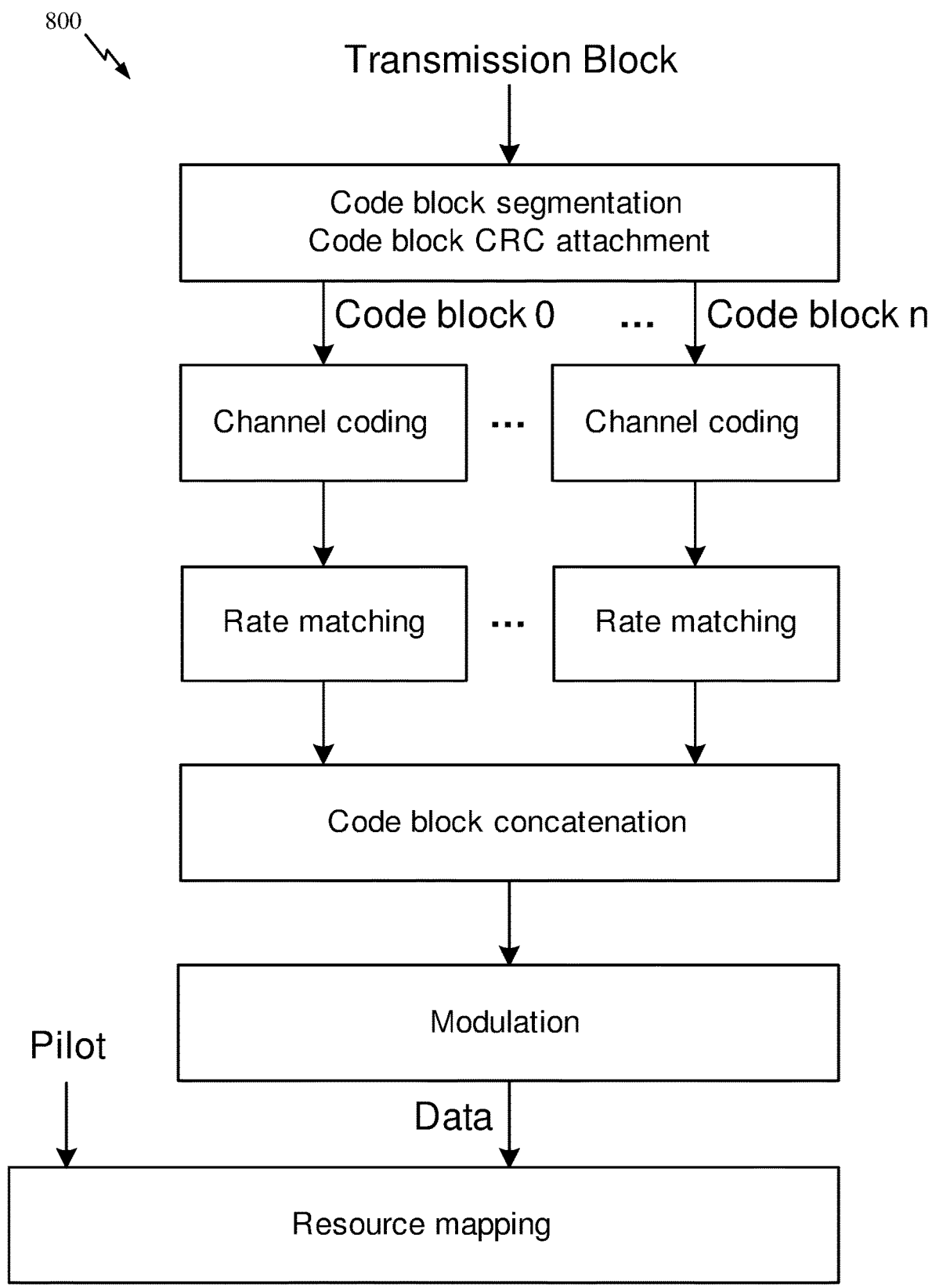
FIG. 8 is a flow diagram illustrating example operations for code block segmentation and resource mapping, in accordance with certain aspects of the present disclosure.

A transmission block can be segmented into multiple code blocks. FIG. 8 is a flow diagram illustrating example operations 800 for code block segmentation and resource mapping, in accordance with certain aspects of the present disclosure. As shown in FIG. 8, a large data transmission block can be segmented into several code blocks. The smaller code blocks may reduce decoding complexity at the receiver side and can enable early termination with cyclic redundancy check (CRC) for each code block. After channel coding and rate matching for each code block, data is concatentated, modulated, and mapped into a resource grid (e.g., similar to the resource grid illustrated in FIG. 7) for transmission.

The MCS may be determined based on a given transmission block and data length. The determined MCS may be applied to each of the code blocks of the segmented transmission block. However, as mentioned above, this may lead to varied demodulation SNR due to the varying distances a symbol is from the last pilot location the MCS was determined.

Figure 9:
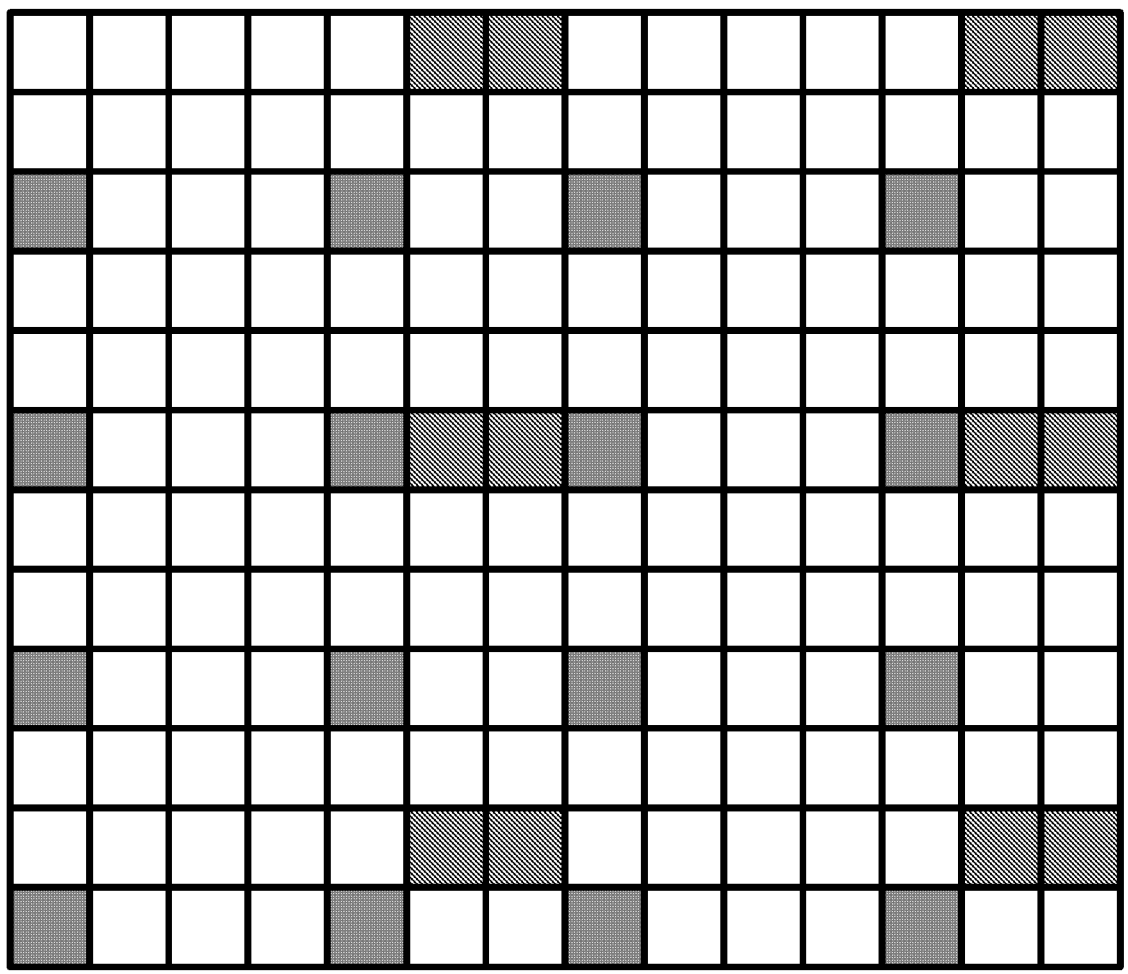
FIG. 9 is a grid illustrating an example mapping of data, pilot, and demodulation reference signals (DM-RS) to time and frequency resources, in accordance with certain aspects of the present disclosure.
Figure 10:
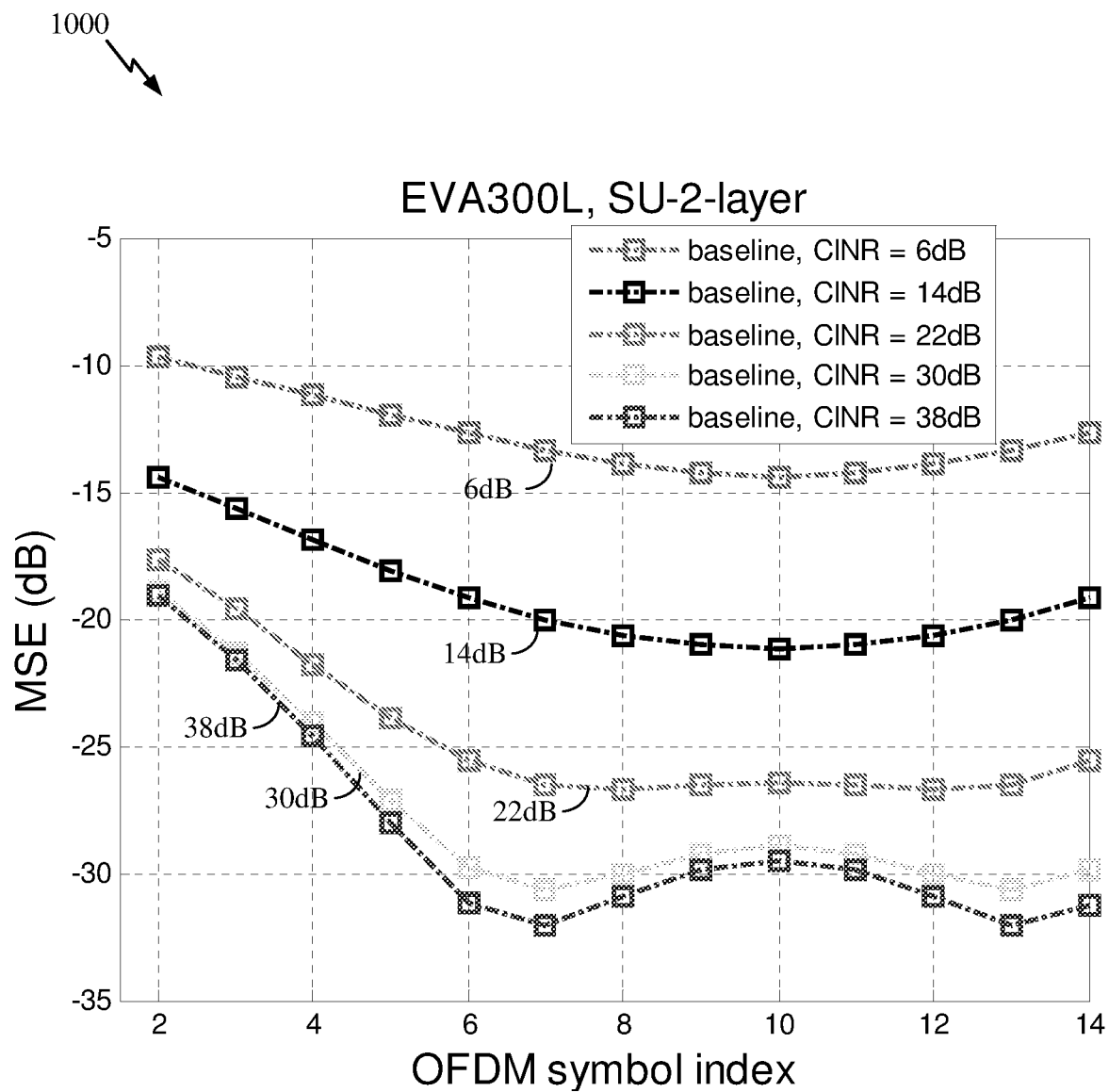
FIG. 10 is a graph illustrating error rate over for time for code block transmissions at different carrier-to-interference noise ratios (CINRs), in accordance with certain aspects of the present disclosure.

FIG. 9 is a grid illustrating an example resource mapping 900 of data, pilot, and demodulation reference signals (DM-RS), in accordance with certain aspects of the present disclosure. In the example resource mapping 900, illustrated in FIG. 9, the DM-RS pattern is aligned to the right edge of the resource block. The same MCS is applied for multiple codeblocks. The same resource mapping is used for retransmission as was used for the first transmission. FIG. 10 is a graph 1000 illustrating error rate over for time (symbols) for code block transmissions using the same MCS at different Dopplers (carrier-to-interference noise ratios (CINRs)). As shown in FIG. 10, especially in the cases of high Doppler (e.g., 22-28 dB), since the first code block is far from the pilot, the first code block has high loss due to poor channel estimation of earlier symbols. Additionally, if retransmissions use the same resource mapping, then the channel estimation performance will be the same for the retransmissions. So there is a problem in the first code block (represented by the bottom curve) due to the poor channel estimation performance due to the fact that it is far away from the pilot. Using flexible MCS can help reduce the fail rate at the first code block.

Figure 11:
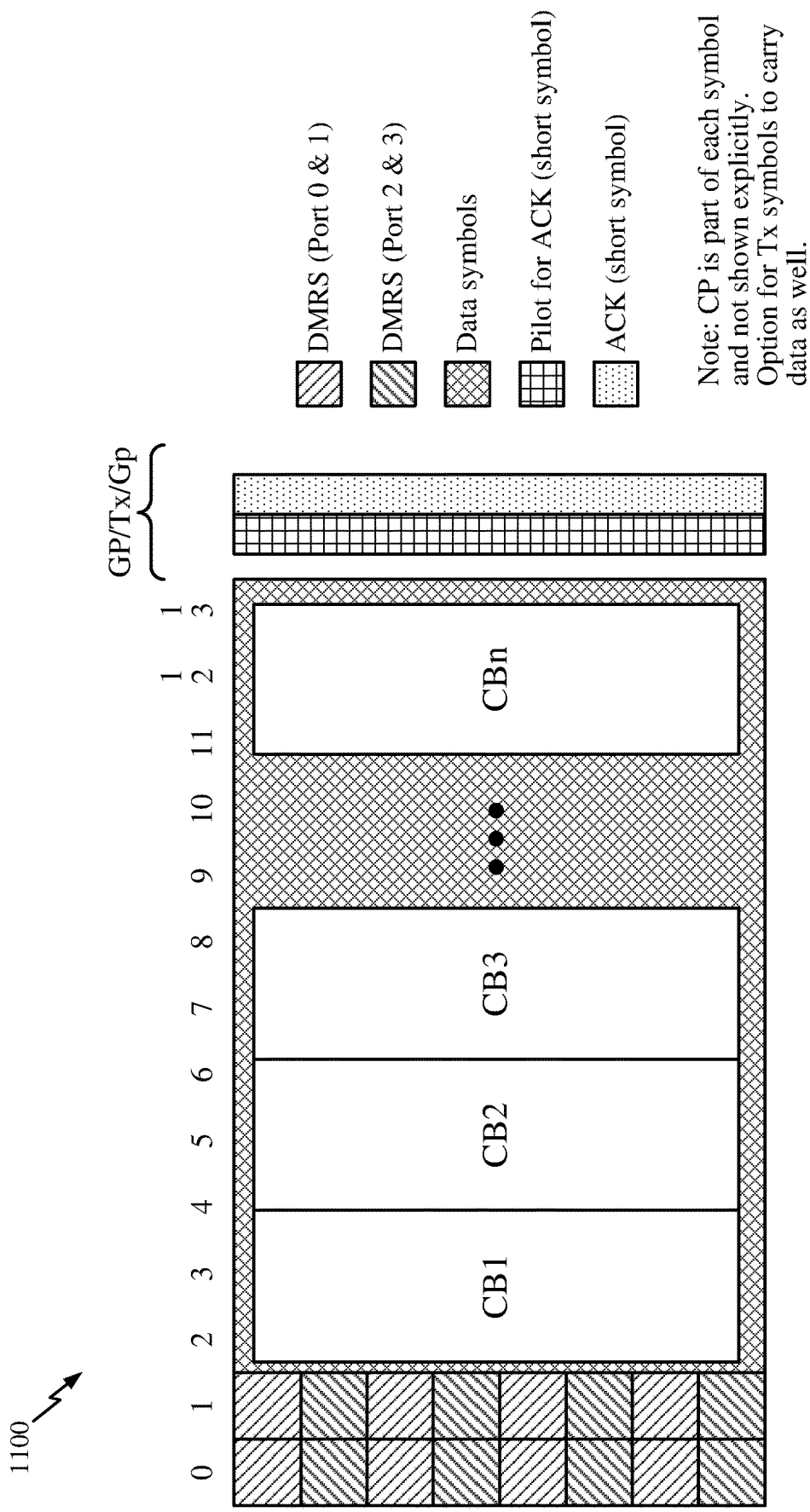
FIG. 11 is a grid illustrating an example resource mapping of a self-contained structure, in accordance with certain aspects of the present disclosure.

Certain systems (e.g., 5G systems) may use a self-contained structure. FIG. 11 is a grid illustrating an example resource mapping 1100 of a self-contained structure, in accordance with certain aspects of the present disclosure. As shown in FIG. 11, DMRS pattern can be aligned on the left side, for example, in the symbols 0 and 1. The code blocks CB1 . . . CBn are transmitted in the remaining symbols. As also shown in FIG. 11, after the last code block CBn of the transmission block, there is a short guard period before transmissions of pilot for ACK and ACK (e.g., in short symbols). Since the pilots are aligned one side, if the code blocks CB1 . . . CBn use the same MCS, the same varied channel estimation performance will occur for the code blocks due to the different distances the code blocks are from the last pilot location. Looking at FIG. 11, one finds code block one (CB1) is assigned at a very early symbol, which means that CB1 will perform much better than the last code block assigned, because the last code block is far away from the pilots.

Accordingly, techniques and apparatus for flexible MCS determination and resource mapping are desirable to improve demodulation SNR, particularly, for code blocks far from pilots in the high Doppler cases.

Certain aspects of the present disclosure discuss techniques for flexible resource mapping and MCS determination in wireless communication systems. For example, these techniques include determining a MCS on a per-symbol or per-code block basis—rather than using a same MCS based on the same pilot for all of the code blocks within a transport block. As another example, these techniques can include using different resource mappings for the code blocks for hybrid automatic repeat request (HARM) retransmissions of the transport block.

Example Flexible MCS Determination

FIG. 12 illustrates example operations 1200 that may be performed by a transmitter, for flexible resource mapping and modulation and coding scheme (MCS) determination at the transmitter (e.g., a wireless node such as UE 206 or eNB 204), in accordance with certain aspects of the present disclosure.

Operations 1200 begin, at 1202, by determining modulation and coding schemes (MCSs) to use for each of multiple portions of a transport block. At the 1204, the wireless node transmits the portions of the transport block according to the determined MCSs to another wireless node. As shown in FIG. 12, optionally, at 1206, the wireless node may provide, to the other wireless node, an indication of the determined MCSs.

According to certain aspects, MCS can be designed (e.g., determined) for each code block or for each symbol. For example, as opposed to using the same MCS for each code block of the entire transmission block. In this case, MCS determination can also be based on channel correlation (e.g., Doppler), for example, in addition to channel state feedback (CSF) applied. For example, the MCS can be determined according to following formula:

$$MCS(n) = f(CQI + \Delta CQI + g(Doppler, n)),$$

where CQI and $\Delta$CQI are the CSF, and g is the channel correlation, and n is the offset for symbol n at a given Doppler.

The determine MCS for the code blocks/symbols can be signaled to the receiver side. For example, an MCS reference and offset can be transmitted, where MCSs across code blocks/symbols can be represented as a first order polynomial. Thus, by taking into account channel correlation and determining MCS on a per code block or per symbol basis, flexible MCS can be used to achieve better demodulation SNR performance.

Figure 13:
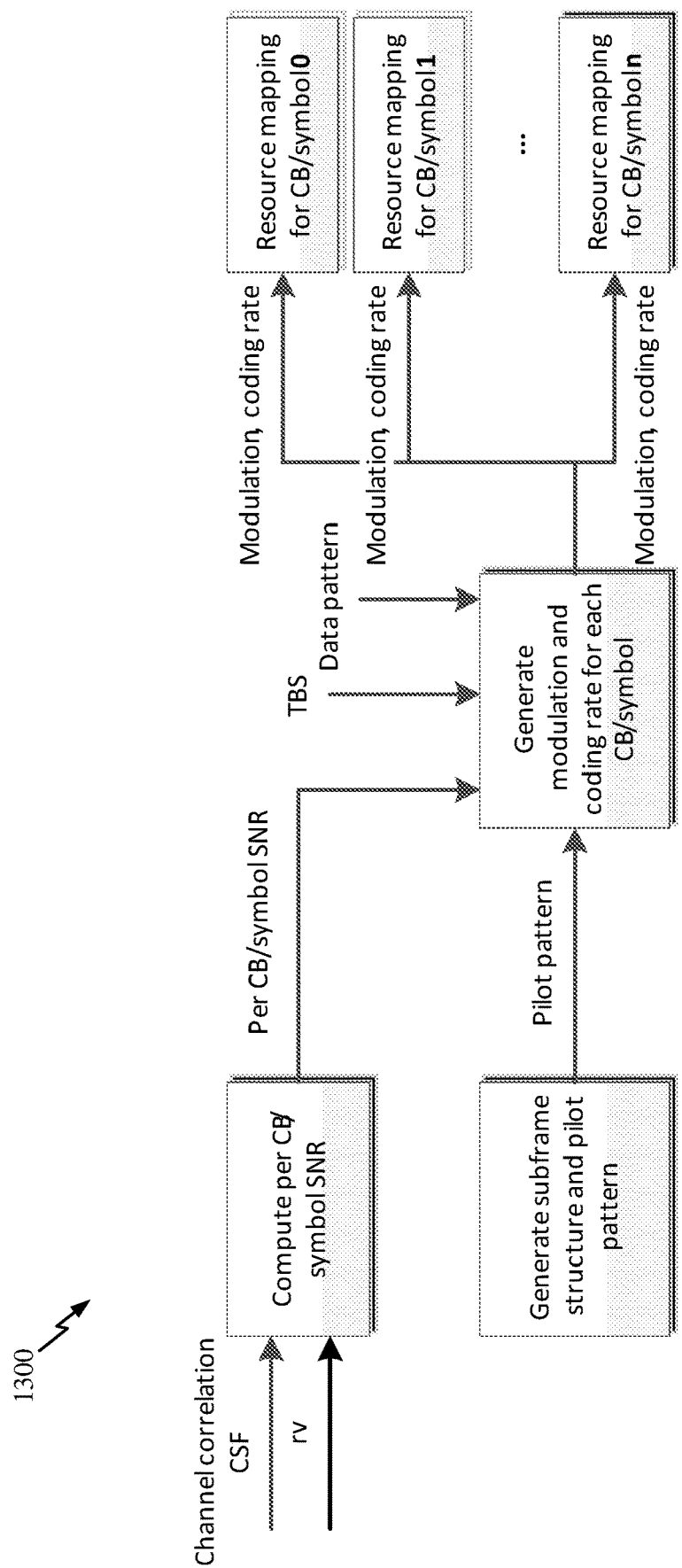
FIG. 13 is a flow diagram illustrating example operations for flexible resource mapping and MCS determination at the transmitter, in accordance with certain aspects of the present disclosure.

According to certain aspects, resource mapping can be different between the original transmission and retransmissions. In some cases, a redundancy version can be applied for MCS generation in a HARQ retransmission. Also, flexible MCS may be applicable in both downlink and uplink transmissions. FIG. 13 is a flow diagram illustrating example operations for flexible resource mapping and MCS determination at the transmitter, in accordance with certain aspects of the present disclosure. With flexible MCS, the modulation and coding rate can be designed for each code block, or even for each symbol, in the whole transmission block.

Figure 14:
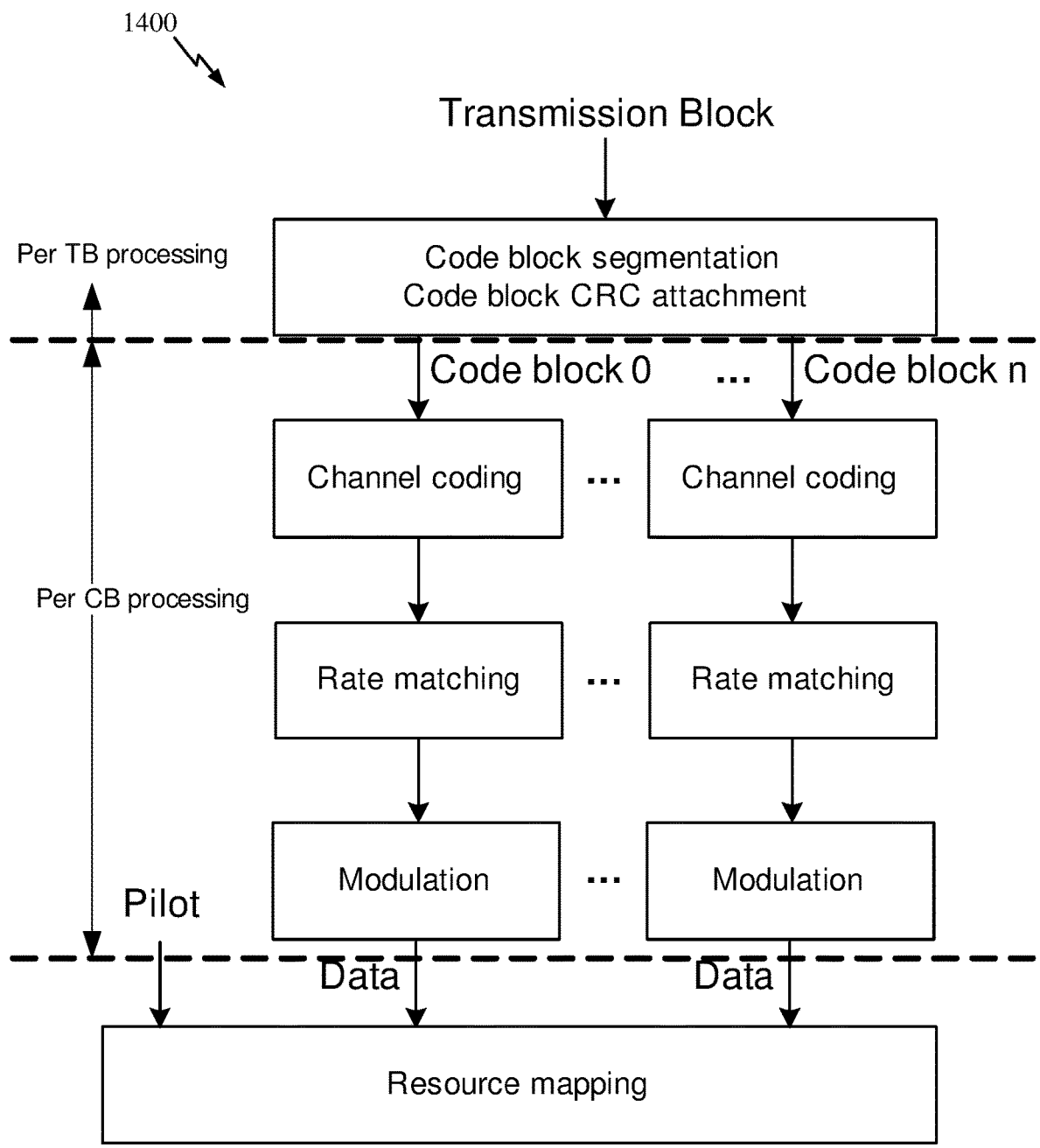
FIG. 14 is a flow diagram illustrating example operations for flexible resource mapping and MCS determination per code block at the transmitter, in accordance with certain aspects of the present disclosure.

FIG. 14 is a flow diagram illustrating example operations for flexible resource mapping and MCS determination per code block at the transmitter, in accordance with certain aspects of the present disclosure. For per code block MCS determination, the same MCS can be used for each symbol within a code block, but different MCS are used for the symbols in different code blocks. For each code block, the insets would be the same.

Figure 15:
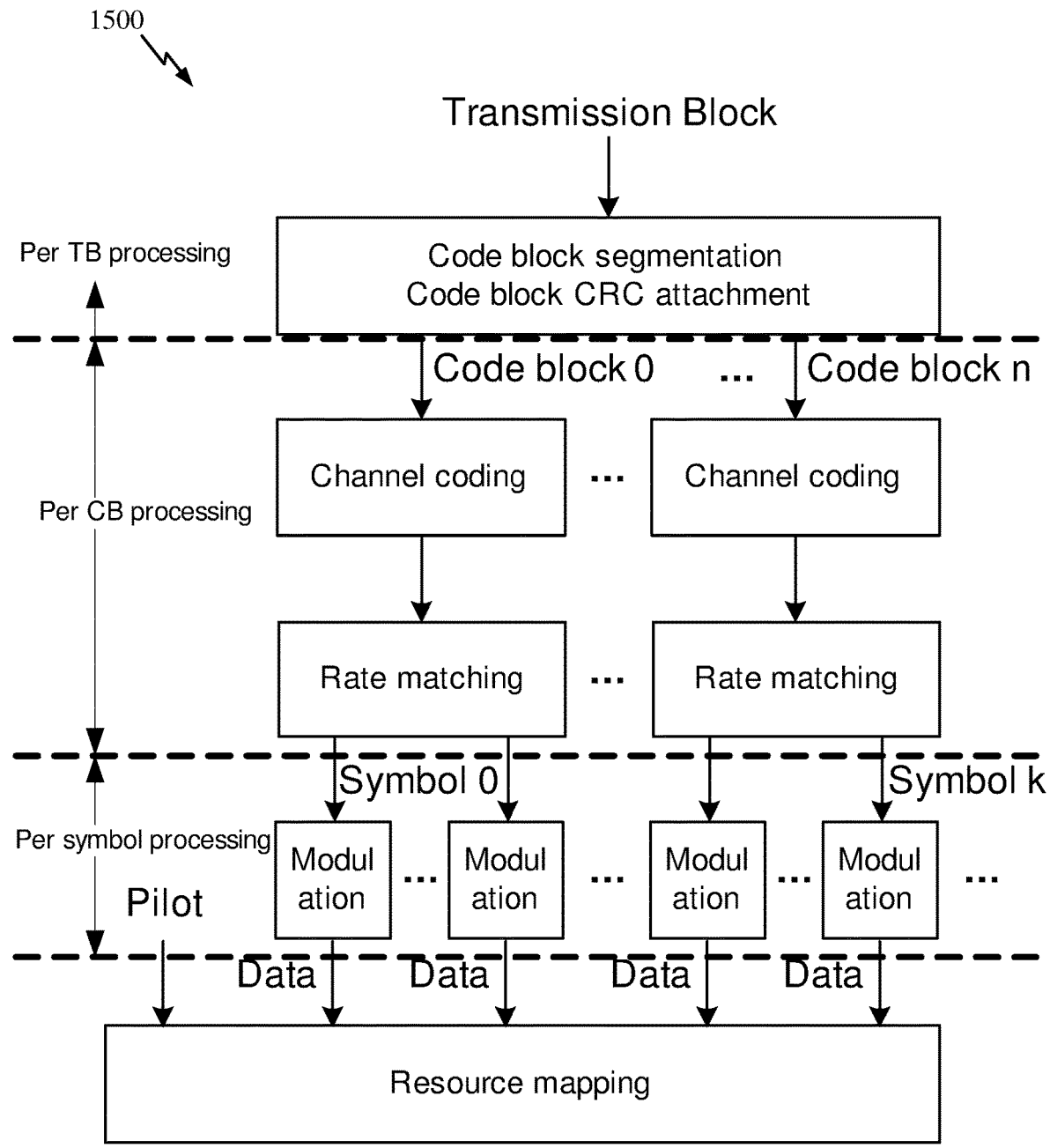
FIG. 15 is a flow diagram illustrating example operations for flexible resource mapping and MCS determination per symbol at the transmitter, in accordance with certain aspects of the present disclosure.

FIG. 15 is a flow diagram illustrating example operations for flexible resource mapping and MCS determination per symbol at the transmitter, in accordance with certain aspects of the present disclosure. For per symbol MCS determination, a different MCS can be used for each symbol in a code block. Each code block could have multiple MCSs.

Figure 16:
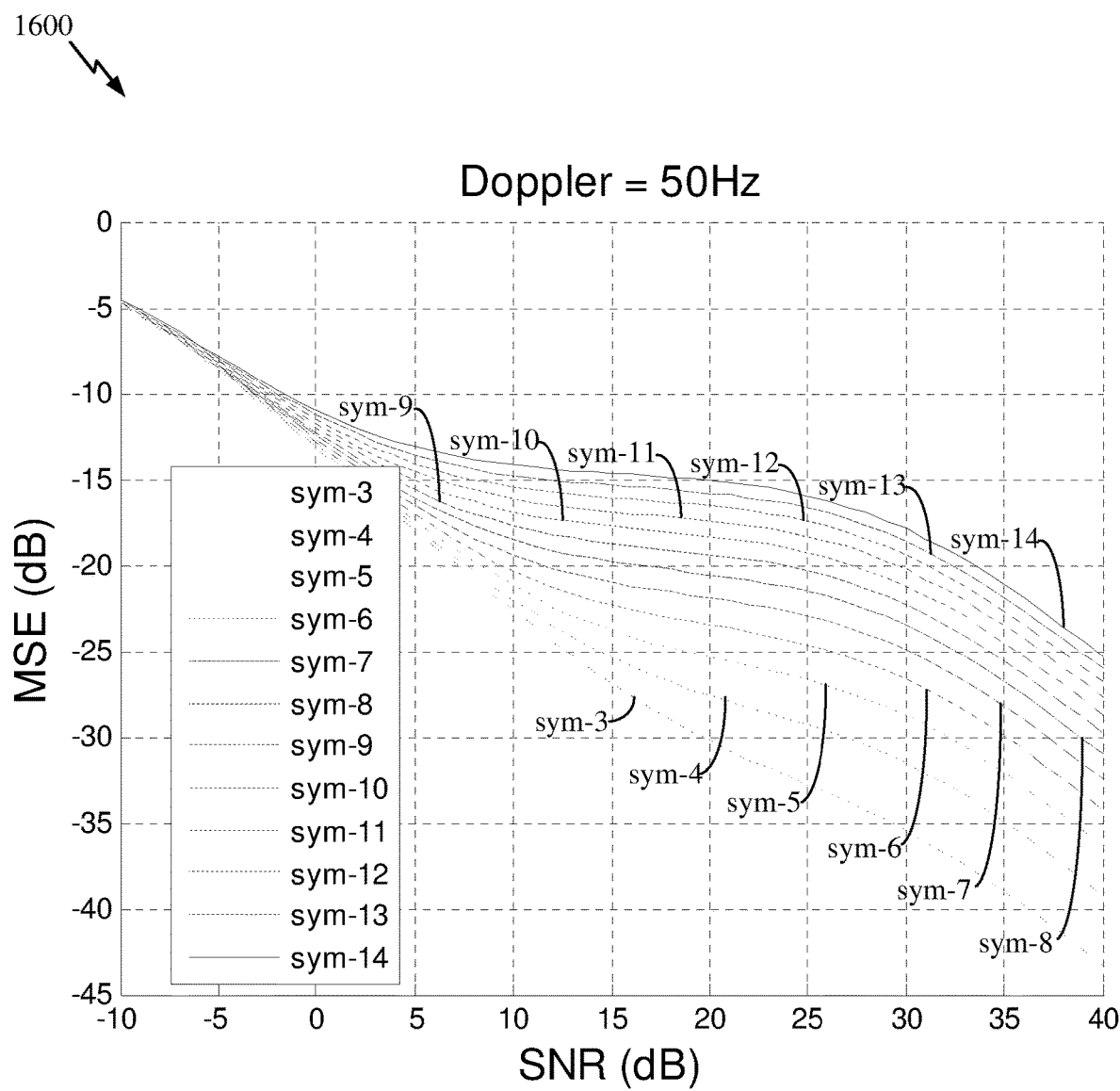
FIG. 16 is a graph illustrating error rate versus signal-to-noise ratio (SNR) for various symbols, in accordance with certain aspects of the present disclosure.

FIG. 16 is an example graph illustrating a baseline error rate versus signal-to-noise ratio (SNR) for various symbols where the same MCS is applied. In FIG. 16, performance for 14 OFDM symbols is shown (e.g., for 14 one millisecond transmission time intervals (TTIs)) at 50 Hz Doppler. The resource mapping used for the example shown FIG. 16 includes 2 pilots and 12 data symbols (e.g., code blocks). Each data symbol is assumed to be a code block. Feedback includes ACK/NACK and channel quality information (CQI) for each transmission block and a target BLER of 10%. It uses a CQI back off (target BLER=10%). The baseline is the same MCS for each codeblock.

$MCS(n) = f(CQI + \Delta CQI) \Delta CQI$ is output of outer loop

The improved method and apparatus may use different MCSs for one or more code blocks:

$MCS(n) = f(CQI + \Delta CQI + g(Doppler, n)), g(Doppler, n)$:
offset for symbol $n$ at a given Doppler.

The example also assumes 10 dB processing gain in frequency domain for channel estimation at the receiver and minimum mean square error (MMSE) in time domain (not using pilots from previous TTIs), and no decoding chain.

Figure 17:
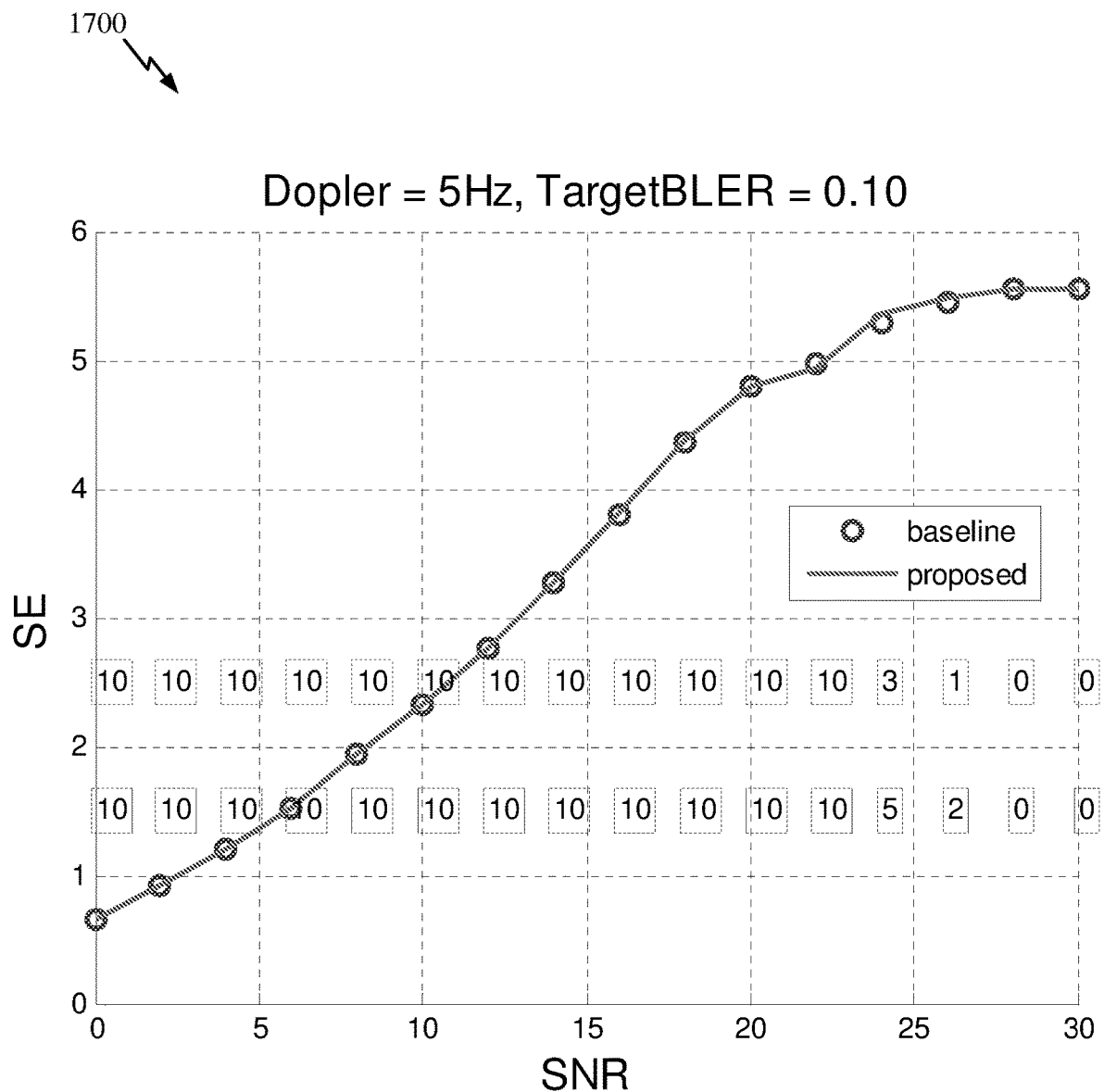
FIG. 17 is a graph illustrating error rate versus SNR at low Doppler for transport block transmission using constant and flexible MCS, in accordance with certain aspects of the present disclosure.
Figure 17A:
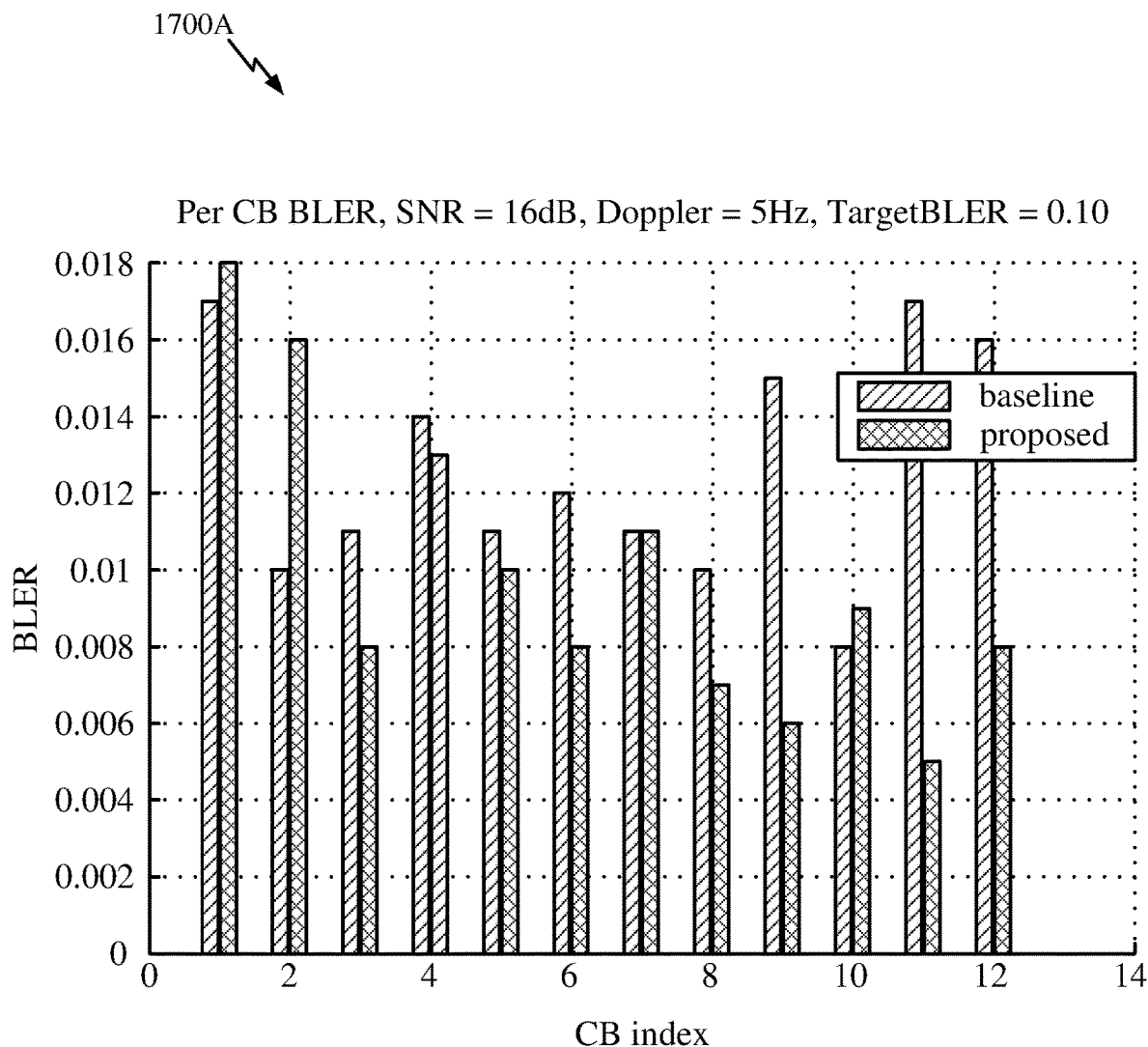
FIG. 17A is a graph illustrating block error rate (BLER) per code block at low Doppler for transport block transmission using constant and flexible MCS, in accordance with certain aspects of the present disclosure.
Figure 18:
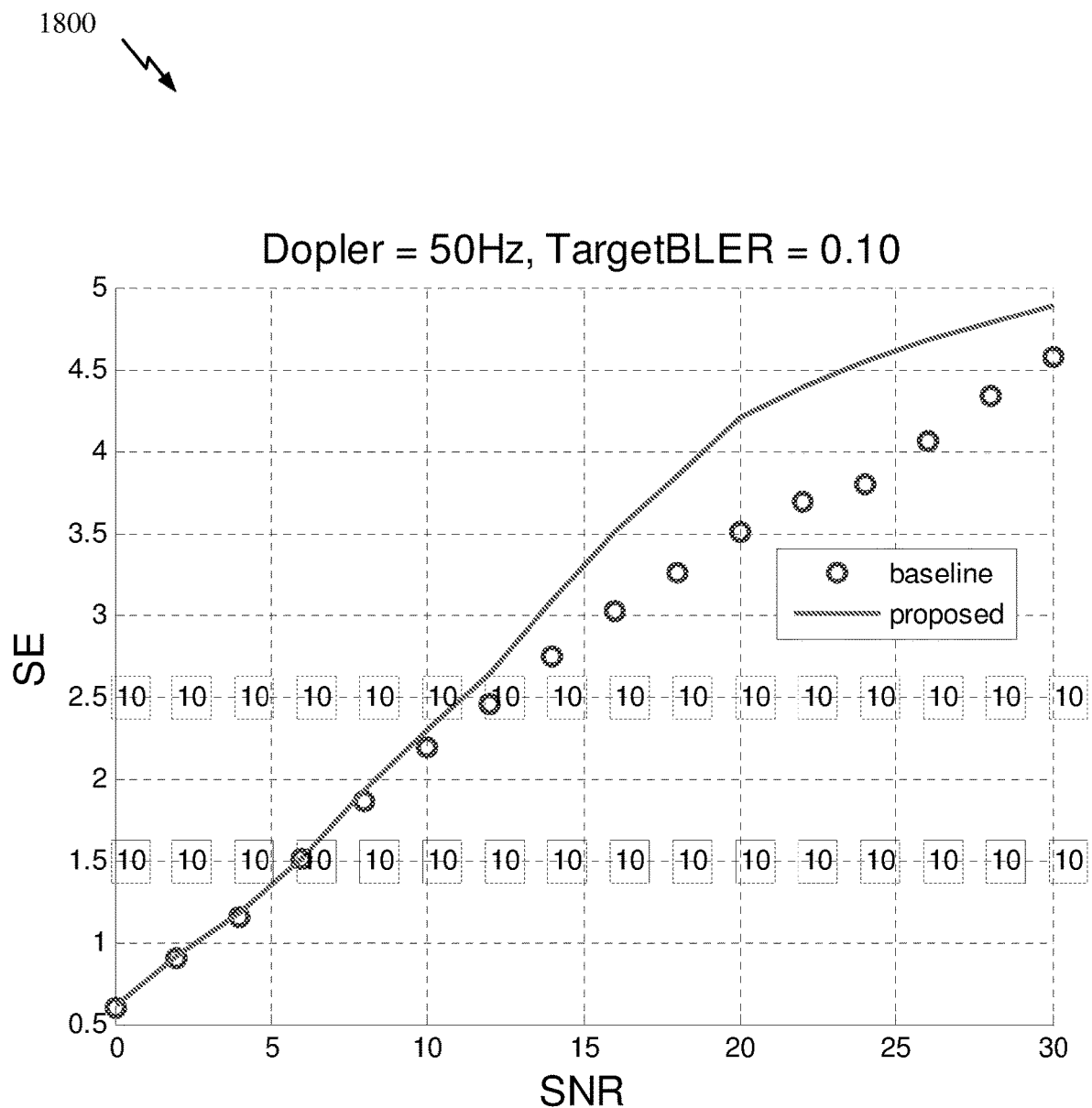
FIG. 18 is a graph illustrating error rate versus SNR at high Doppler for transport block transmission using constant and flexible MCS, in accordance with certain aspects of the present disclosure.
Figure 18A:
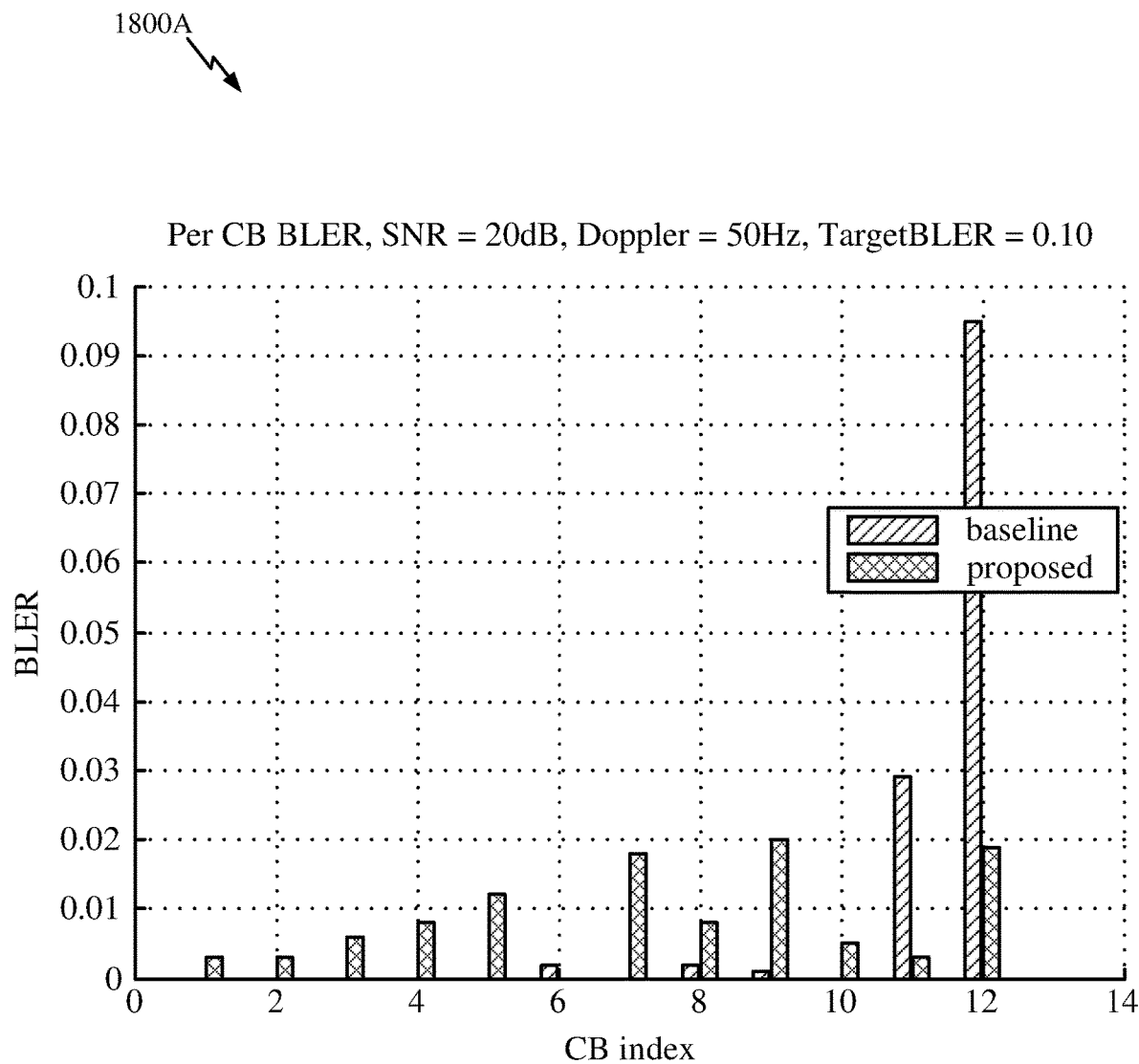
FIG. 18A is a graph illustrating BLER per code block at high Doppler for transport block transmission using constant and flexible MCS, in accordance with certain aspects of the present disclosure.
Figure 19:
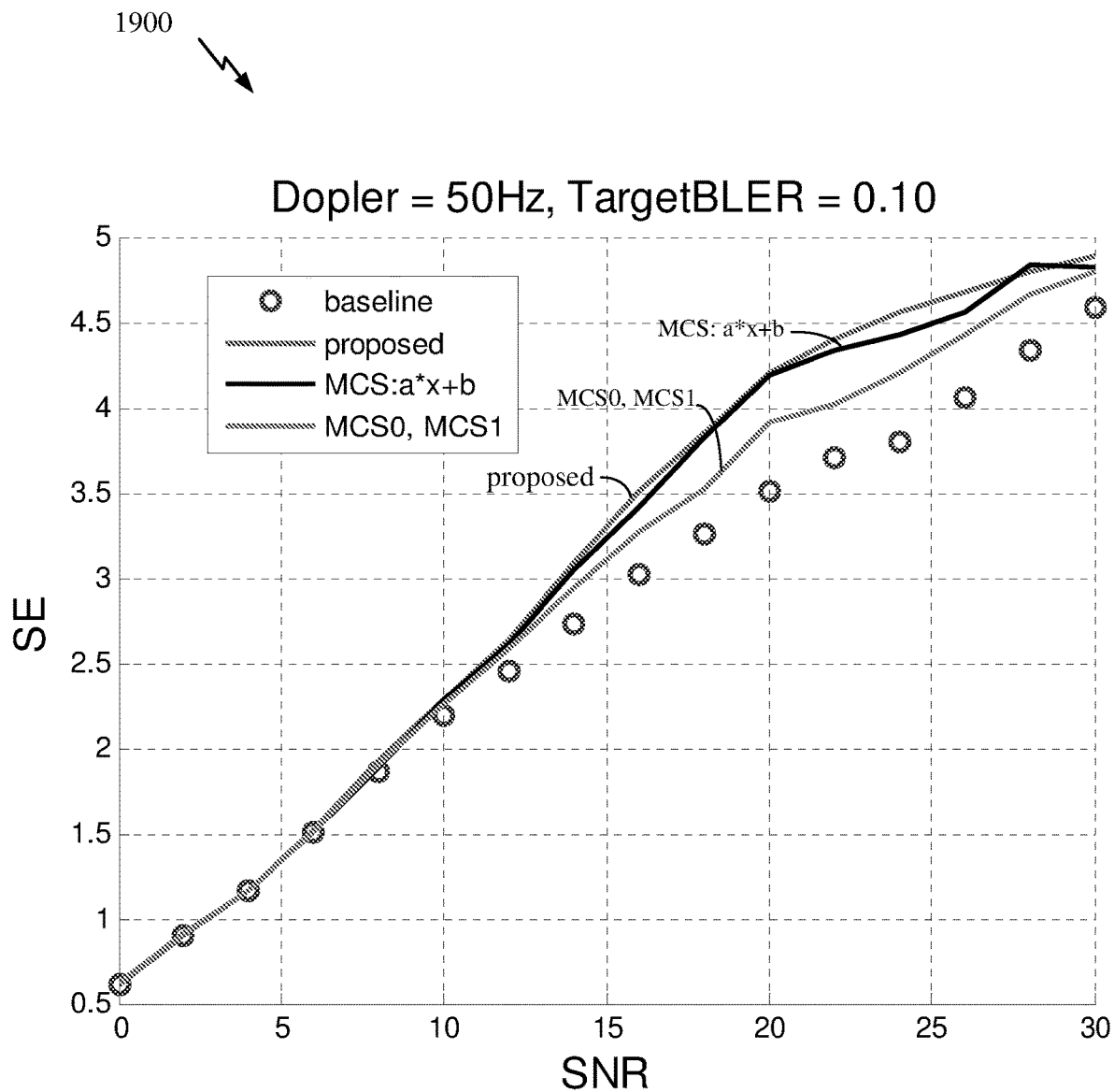
FIG. 19 is a graph illustrating error rate versus SNR at high Doppler for transport block transmission using constant and flexible MCS, in accordance with certain aspects of the present disclosure.
Figure 19A:
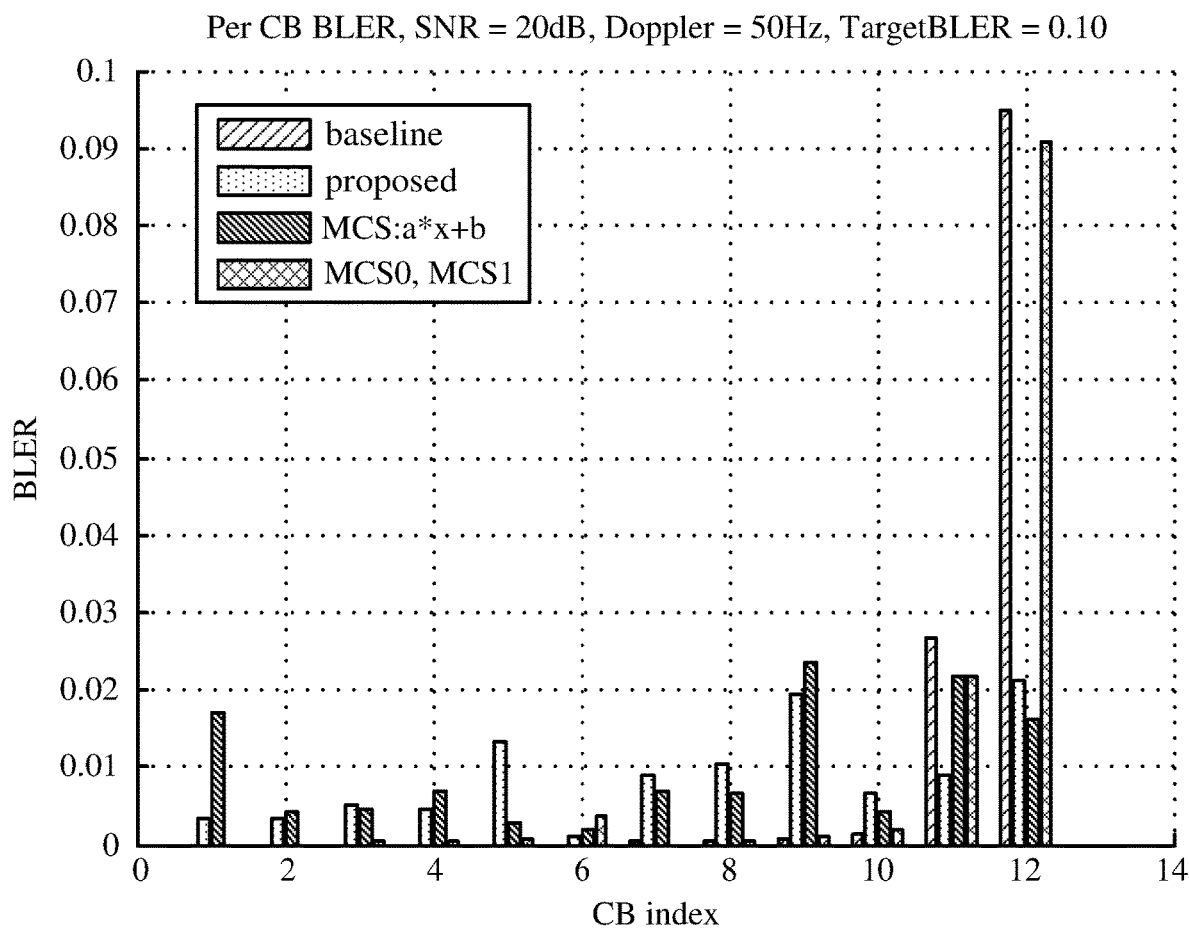
FIG. 19A is a graph illustrating BLER per code block at high Doppler for transport block transmission using constant and flexible MCS, in accordance with certain aspects of the present disclosure.

FIG. 17 is a graph illustrating error rate versus SNR at low Doppler for transport block transmission using constant (baseline) and flexible MCS (proposed method and apparatus), in accordance with certain aspects of the present disclosure. As shown in FIG. 17, the performance of the baseline and the proposed is similar at low Doppler. FIG. 17A is a graph illustrating block error rate (BLER) per code block at low Doppler for transport block transmission using constant and flexible MCS, in accordance with certain aspects of the present disclosure. As shown in FIG. 17 and FIG. 17A, at low Doppler the performance using flexible MCS may be similar to the baseline performance. However, as shown in FIG. 18-19A, at high Doppler, performance is significantly increased using flexible MCS (e.g., improved spectral efficiency).

Example Resource Remapping in HARQ Retransmission

FIG. 20 illustrates example operations 2000 that may be performed by a transmitter (e.g., a wireless node such as UE 206 or eNB 204) for resource remapping for retransmissions, in accordance with certain aspects of the present disclosure.

Operations 2000 begin, at 2002, by determining a mapping of portions of a transport block to transmission resources. At 2004, the wireless node transmits the transport block according to the first mapping. At 2006, the wireless node determines one or more other mappings of portions of the transport block to transmission resources. At 2008, the wireless node re-transmits the transport block, at least once, according to one of the other mappings.

Figure 21:
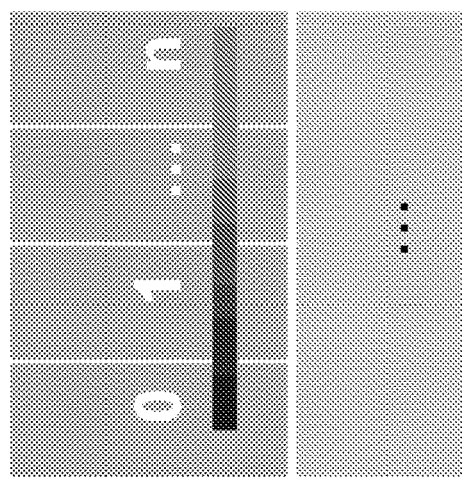
FIG. 21 illustrates code transmission orders for resource remapping for retransmissions, in accordance with certain aspects of the present disclosure.
Figure 21:
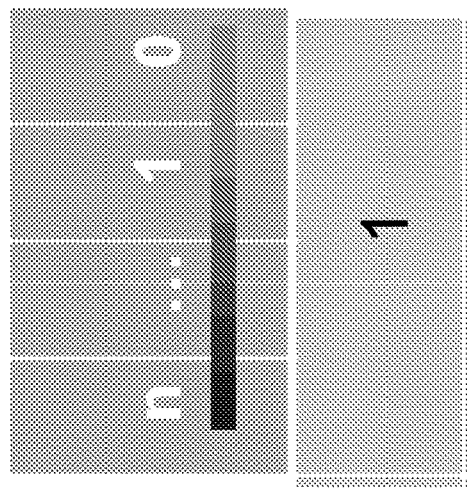
Figure 21:
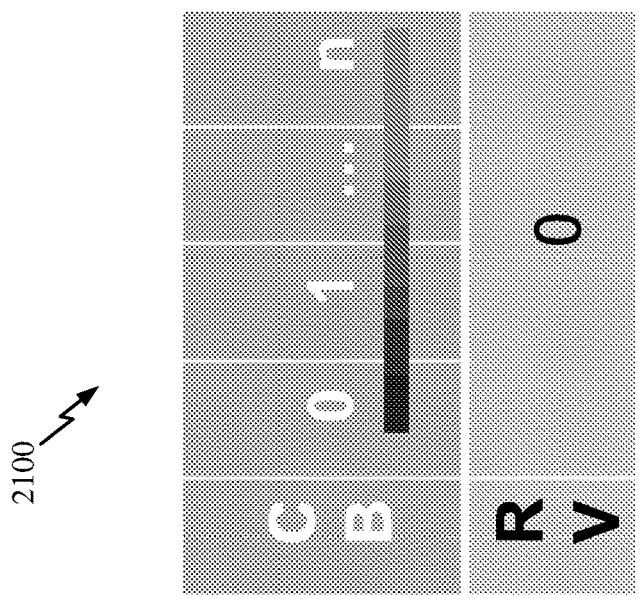

According to certain aspects, even when the same MCS is applied for the code blocks in the transmission block, performance can be increased by remapping resources in HARQ retransmissions. One example implementation is illustrated in FIG. 21. As shown in FIG. 21, the code blocks of the transmission block can be numbered 0 to n. In an original transmission (redundancy version 0) of the transmission block, the code blocks can be sent in sequential order (i.e., code block 0 in symbol 0, code block 1 in symbol 1 . . . code block n in symbol n). In the first HARQ retransmission (rv 1), the code blocks could be mapped in reverse (flipped) order of the previous transmission (i.e., code block n in symbol 0 . . . code block 1 in symbol n−1, code block 0 in symbol n). Then in the next HARQ retransmission (rv 2), the code blocks could be mapped in the same order as the original transmission. Thus, code blocks which may have low performance in the original transmission may have better performance in the HARQ retransmission (since the code block is closer to the pilots). It is noted; however, that other resource mappings and remappings can be used for the original transmission and retransmissions. So here, in the first transmission, the code blocks were mapped in increasing order. For the retransmission, the mapping order was reversed. Hence, the advantage is that the distance from the pilots changes for code blocks so that that code blocks which may have low performance in the original transmission may have better performance in the HARQ retransmission.

Example MCS Back-Off for Later Code Blocks

Figure 22:
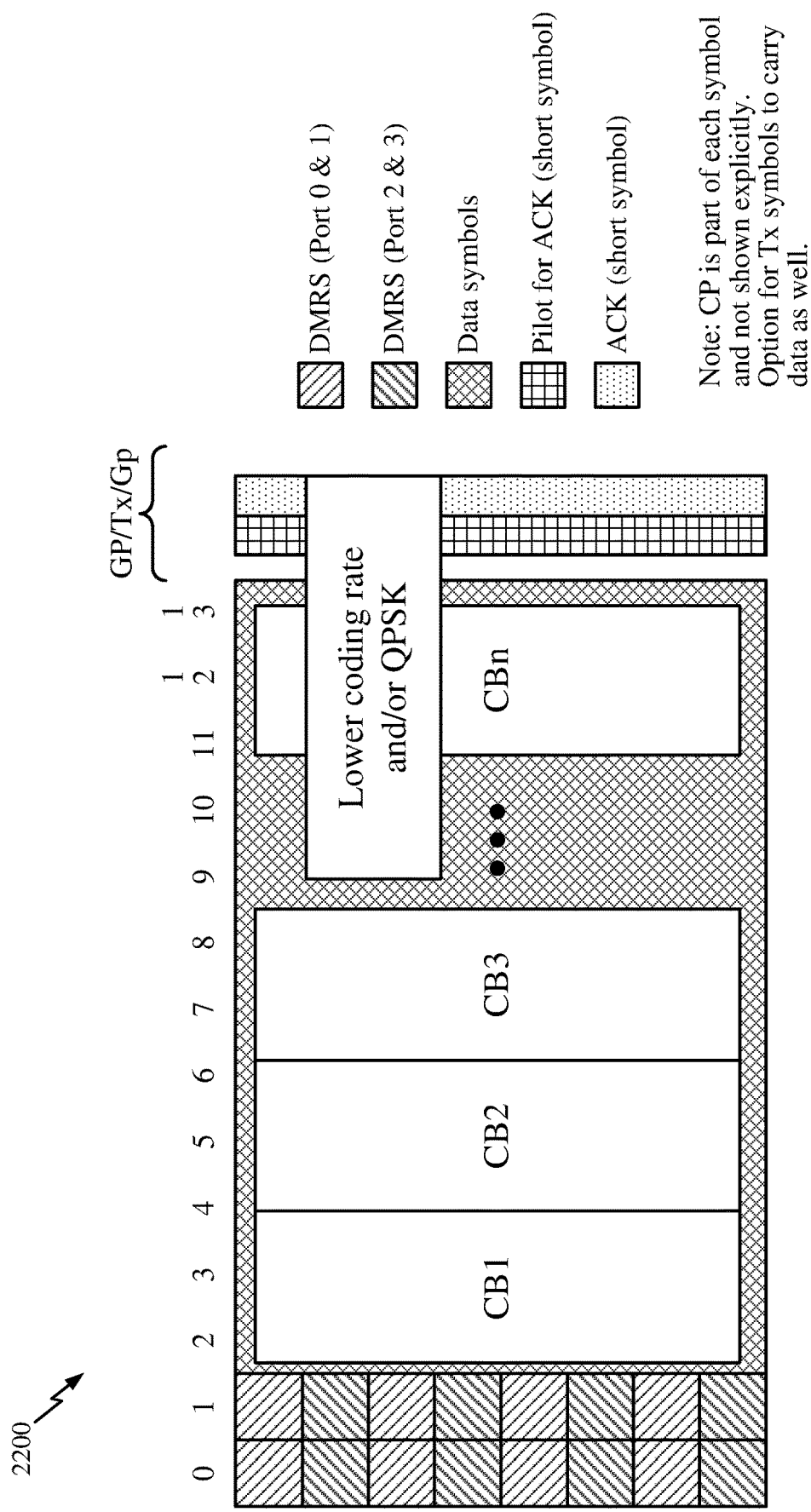
FIG. 22 is a grid illustrating an example resource mapping with a MCS back-off for a last code block, in accordance with certain aspects of the present disclosure.

In some cases, it may desirable to ensure faster decoding of the last code block or later code blocks in the resource mapping. For example, in delay sensitive cases it is desirable to an acknowledgment (ACK) for the code block to be sent in the same TTI, however; since there is only a short guard period before ACKs are to be transmitted (as shown in FIG. 22), there may not be much time available for processing the last code block or code blocks. Less processing time may be used if lower coding rate and/or MCS back-off is used. MCS back-off refers to using a MCS having a lower index, indicating a lower coding rate or a lower modulation order is used.

According to certain aspects, MCS back-off may be performed for later code blocks. For example, a lower coding rate or modulation order (e.g., quadrature phase shift keying (QPSK)) may be used for the last code block or code blocks than for the other code blocks, as shown in FIG. 22 for example. Since the low coding rate or modulation order may use less processing time for decoding, this may help to ensure that the last code block(s) is processed in time for the ACK in the same TTI.

In addition, in delay insensitive cases, the corresponding ACK for the last code block(s) may not be sent in the same TTI. However, channel estimation can be improved by non-causal processing based on DM-RS and virtual pilots constructed from the last code block(s). Thus, the lower code rate and/or MCS back-off may also be useful for data aided channel estimation (DACE) in delay insensitive scenarios.

Example Transmission Scheme Fallback for Later Code Blocks

Figure 23:
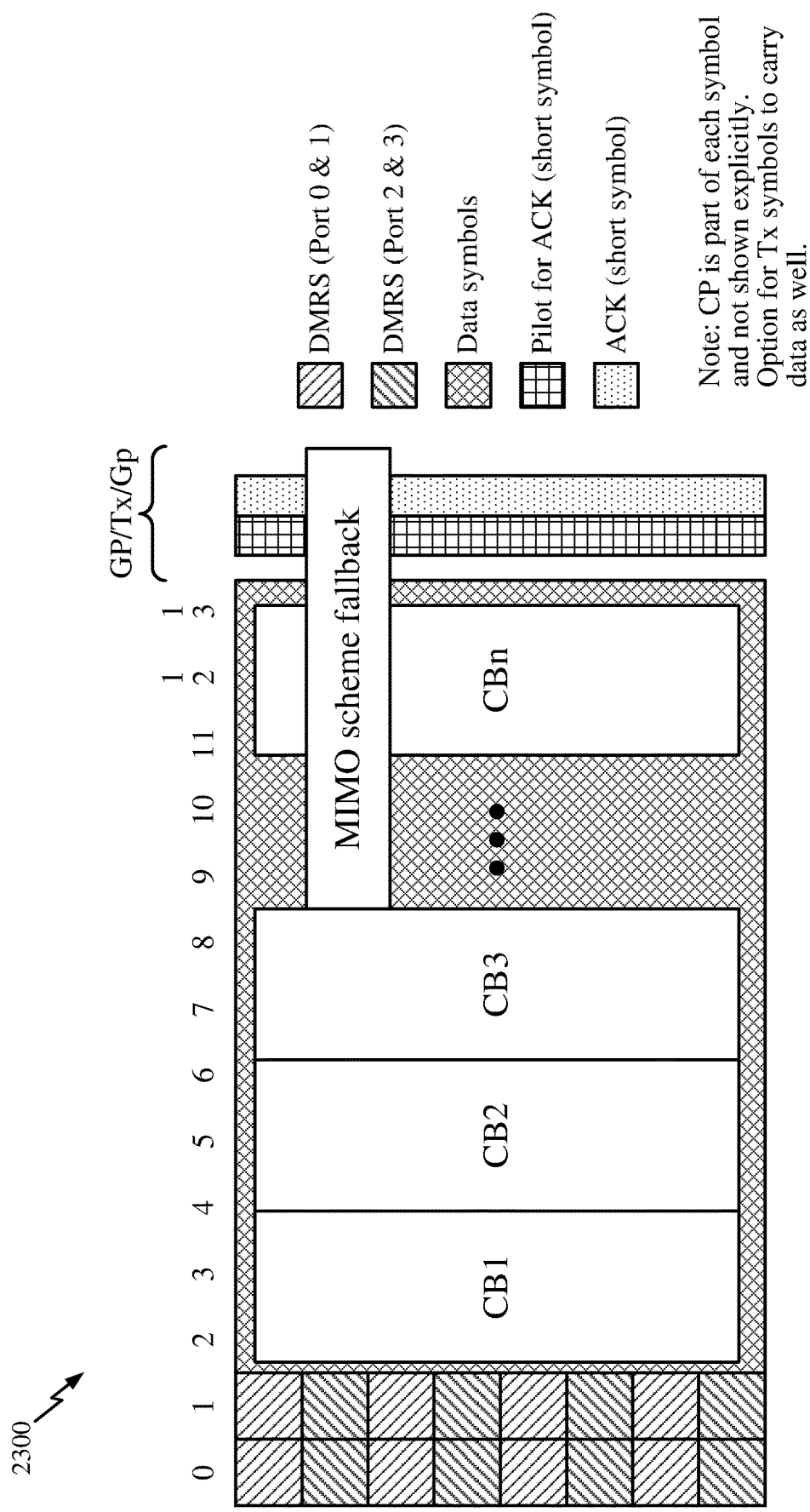
FIG. 23 is a grid illustrating an example resource mapping with a different transmission scheme for a last code block, in accordance with certain aspects of the present disclosure.

According to certain aspects, for the delay sensitive scenarios and DACE in the delay insensitive scenarios, a different transmission scheme can be used for the last code block(s) as shown in FIG. 23. For example, while multiple input multiple out (MIMO) transmission schemes may be used for the earlier code blocks, a single code word transmission scheme (e.g., Tx diversity) may be used for the last code block(s). Alternatively, a multiple code word transmission scheme may be used for the last code block(s), but with a large delay cyclic delay diversity (CDD). In yet another alternative, a multiple code word transmission scheme may be used, but with a constrained code block size.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

In some cases, rather than actually transmitting a frame, a device may have an interface to output a frame for transmission. For example, a processor may output a frame, via a bus interface, to an RF front end for transmission. Similarly, rather than actually receiving a frame, a device may have an interface to obtain a frame received from another device. For example, a processor may obtain (or receive) a frame, via a bus interface, from an RF front end for transmission.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

For example, means for determining MCSs for each of multiple portions of a transport block may comprise a processing system, which may include one or more processors, such as the TX processor 616, transmitter(s) 618, and/or the controller/processor 675 of the wireless base station 610 illustrated in FIG. 6, and/or the TX processor 668, the transmitter(s) 654, and/or the controller/processor 659 of the user equipment 650 illustrated in FIG. 6. Means for transmitting the portions of the transport block according to the determined MCSs to a wireless node may comprise a transmitter, which may include TX processor 616, transmitter(s) 618, and/or the antenna(s) 620 of the wireless base station 610 illustrated in FIG. 6, and/or the TX processor 668, the transmitter(s) 654, and/or the antenna(s) 652 of the user equipment 650 illustrated in FIG. 6.

As another example, means for determining a mapping of portions of a transport block to transmission resources and means for determining one or more other mappings of portions of the transport block to transmission resources may comprise a processing system, which may include one or more processors, such as the TX processor 616, transmitter(s) 618, and/or the controller/processor 675 of the wireless base station 610 illustrated in FIG. 6, and/or the TX processor 668, the transmitter(s) 654, and/or the controller/processor 659 of the user equipment 650 illustrated in FIG. 6. Means for transmitting the transport block according to the first mapping and means for re-transmitting the transport block, at least once, according to one of the other mappings may comprise a transmitter, which may include TX processor 616, transmitter(s) 618, and/or the antenna(s) 620 of the wireless base station 610 illustrated in FIG. 6, and/or the TX processor 668, the transmitter(s) 654, and/or the antenna(s) 652 of the user equipment 650 illustrated in FIG. 6.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a wireless node (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein.

Further, it should be appreciated that modules and/or other appropriate means for performing the methods and techniques described herein can be downloaded and/or otherwise obtained by a wireless node and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a wireless node and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications, comprising:
    determining, for each portion of a plurality of portions of a transport block, a modulation and coding scheme (MCS) to use for that portion of the transport block, wherein the determining is based, at least in part, on channel state feedback (CSF) and channel correlation, and wherein the determining includes determining different MCSs for at least two of the portions; and
    transmitting each portion of the transport block, to a wireless node, according to the determined MCS for that portion.

2. The method of claim 1, wherein:
    the plurality of portions of the transport block comprise code blocks; and
    determining, for each portion of the plurality of portions of the transport block, the MCS to use for that portion of the transport block comprises determining MCS per-code block.

3. The method of claim 1, wherein:
    the plurality of portions of the transport block comprise symbols; and
    determining, for each portion of the plurality of portions of the transport block, the MCS to use for each portion of the transport block comprises determining MCS per-symbol.

4. The method of claim 1, further comprising providing, to the wireless node, an indication of the determined MCS for each portion of the plurality of portions of the transport block.

5. The method of claim 4, wherein the indication of the determined MCS for each portion of the plurality of portions of the transport block indicates a first MCS index for a first portion of the transport block and a second MCS index for a second portion of the transport block.

6. The method of claim 4, wherein the indication of the determined MCS for each portion of the plurality of portions of the transport block indicates a reference MCS index parameter and a slope parameter indicating an MCS index offset per portion of the transport block.

7. The method of claim 1, wherein:
    the transmitting is performed using a first mapping of the plurality of portions of the transport block to transmission resources; and
    the method further comprises re-transmitting, at least once, the plurality of portions of the transport block using at least a second mapping of the transport block to transmission resources, wherein the second mapping is different than the first mapping.

8. The method of claim 1, wherein the determining comprises:
    determining a first MCS index for transmitting one or more last portions of the plurality of portions of the transport block; and
    determining a second MCS index for transmitting one or more other portions of the pluralities of portions of the transport block, wherein the first MCS index is lower than the second MCS index.

9. The method of claim 8, wherein the first MCS index corresponds to an MCS that uses quadrature phase shift keying (QPSK) modulation.

10. The method of claim 1, wherein the transmitting comprises:
    using a first transmission scheme when transmitting one or more last portions of the plurality of portions of the transport block; and
    using a second transmission scheme when transmitting one or more other portions of the plurality of portions of the transport block.

11. The method of claim 10, wherein the first transmission scheme comprises a single code word transmission scheme, a multiple code word transmission scheme with a large delay cyclic delay diversity (CDD), or a multiple code word transmission scheme with a constrained code block size.

12. The method of claim 11, wherein at least one of: the multiple code word transmission scheme with a large CDD or the multiple code word transmission scheme with a constrained code block size comprises a mapping of multiple code words to a same size of transmission resources.

13. A method for wireless communications, comprising:
    determining a first mapping of portions of a transport block to time resources;
    transmitting the transport block according to the first mapping;
    determining one or more second mappings of the portions of the transport block to time resources, wherein the one or more second mappings are different than the first mapping; and
    re-transmitting the transport block, at least once, according to one of the one or more second mappings.

14. The method of claim 13, further comprising:
    determining a first modulation and coding scheme (MCS) to use for transmission of the transport block based on channel state feedback (CSF);
    using the first MCS for transmitting the transport block;
    determining a second MCS to use for retransmission of the transport block based on CSF; and
    using the second MCS for retransmitting the transport block.

15. The method of claim 13, wherein:
    the portions of the transport block comprise code blocks, and
    determining the one or more second mappings comprises determining a mapping of the code blocks to the time resources in a reverse order relative to an order in which the first mapping maps the code blocks to time resources.

16. An apparatus for wireless communications, comprising:
    means for determining, for each portion of a plurality of portions of a transport block, a modulation and coding scheme (MCS) to use for that portion of the transport block, wherein the determining is based, at least in part, on channel state feedback (CSF) and channel correlation, and wherein the determining includes determining different MCSs for at least two of the portions; and means for transmitting each portion of the transport block, to a wireless node, according to the determined MCS for that portion.

17. The apparatus of claim 16, wherein:
the plurality of portions of the transport block comprise code blocks; and
the means for determining, for each portion of the plurality of portions of the transport block, the MCS to use for that portion of the transport block comprises means for determining MCS per-code block.

18. The apparatus of claim 16, wherein:
the plurality of portions of the transport block comprise symbols; and
the means for determining, for each portion of the plurality of portions of the transport block, the MCS to use for that portion of the transport block comprises means for determining MCS per-symbol.

19. The apparatus of claim 16, further comprising means for providing, to the wireless node, an indication of the determined MCS for each portion of the plurality of portions of the transport block.

20. The apparatus of claim 16, wherein:
the transmitting is performed using a first mapping of the plurality of portions of the transport block to transmission resources; and
the apparatus further comprises means for re-transmitting, at least once, the plurality of portions of the transport block using at least a second mapping of the transport block to transmission resources, wherein the second mapping is different than the first mapping.

21. The apparatus of claim 16, wherein the determining comprises:
determining a first MCS index for transmitting one or more last portions of the plurality of portions of the transport block; and
determining a second MCS index for transmitting one or more other portions of the plurality of portions of the transport block, wherein the first MCS index is lower than the second MCS index.

22. The apparatus of claim 21, wherein the first MCS index corresponds to an MCS that uses quadrature phase shift keying (QPSK) modulation.

23. The apparatus of claim 16, wherein the transmitting comprises:
using a first transmission scheme when transmitting one or more last portions of the plurality of portions of the transport block; and
using a second transmission scheme when transmitting one or more other portions of the plurality of portions of the transport block.

24. The apparatus of claim 23, wherein the first transmission scheme comprises a single code word transmission scheme, a multiple code word transmission scheme with a large delay cyclic delay diversity (CDD), or a multiple code word transmission scheme with a constrained code block size.

25. The apparatus of claim 24, wherein at least one of the multiple code word transmission scheme with a large CDD or the multiple code word transmission scheme with a constrained code block size comprises a mapping of multiple code words to a same size of transmission resources.

26. An apparatus for wireless communications, comprising:
means for determining a first mapping of portions of a transport block to time resources;
means for transmitting the transport block according to the first mapping;
means for determining one or more second mappings of the portions of the transport block to time resources, wherein the one or more second mappings are different than the first mapping; and
means for re-transmitting the transport block, at least once, according to one of the one or more second mappings.

27. The apparatus of claim 26, further comprising:
means for determining a first modulation and coding scheme (MCS) to use for transmission of the transport block based on channel state feedback (CSF);
means for using the first MCS for transmitting the transport block;
means for determining a second MCS to use for retransmission of the transport block based on CSF; and
means for using the second MCS to use for retransmitting the transport block.

28. The apparatus of claim 26, wherein:
the portions of the transport block comprise code blocks, and
means for determining the one or more second mappings comprises means for determining a mapping of the code blocks to time resources in a reverse order relative to an order in which the first mapping maps the code blocks to the time resources.

* * * * *